US010148129B2

(12) United States Patent
Asanuma et al.

(10) Patent No.: US 10,148,129 B2
(45) Date of Patent: Dec. 4, 2018

(54) POWER TRANSMITTING DEVICE AND WIRELESS POWER TRANSMISSION SYSTEM

(71) Applicant: Panasonic Intellectual Property Management Co., Ltd., Osaka (JP)

(72) Inventors: Kenichi Asanuma, Osaka (JP); Tsutomu Sakata, Osaka (JP); Atsushi Yamamoto, Kyoto (JP); Hiroshi Kanno, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 103 days.

(21) Appl. No.: 15/199,408

(22) Filed: Jun. 30, 2016

(65) Prior Publication Data

US 2017/0040843 A1 Feb. 9, 2017

(30) Foreign Application Priority Data

Aug. 6, 2015 (JP) .................. 2015-156215

(51) Int. Cl.
| | |
|---|---|
| H01F 27/42 | (2006.01) |
| H02J 50/12 | (2016.01) |
| H02J 50/60 | (2016.01) |
| H02J 7/02 | (2016.01) |
| H02J 7/04 | (2006.01) |
| H02J 50/80 | (2016.01) |

(52) U.S. Cl.
CPC .............. *H02J 50/12* (2016.02); *H02J 7/025* (2013.01); *H02J 7/027* (2013.01); *H02J 7/045* (2013.01); *H02J 50/60* (2016.02); *H02J 50/80* (2016.02)

(58) Field of Classification Search
CPC .. H02J 7/025; H02J 7/027; H02J 7/045; H02J 50/12; H02J 50/80; H02J 50/60
See application file for complete search history.

(56) References Cited

U.S. PATENT DOCUMENTS

| | | | |
|---|---|---|---|
| 2012/0077537 A1 | 3/2012 | Muratov et al. | |
| 2013/0062959 A1* | 3/2013 | Lee | ...................... H04B 5/0031 307/104 |

(Continued)

OTHER PUBLICATIONS

The Extended European Search Report dated Dec. 20, 2016 for the related European Patent Application No. 16176772.8.

*Primary Examiner* — Jared Fureman
*Assistant Examiner* — Duc M Pham
(74) *Attorney, Agent, or Firm* — Renner Otto Boisselle & Sklar, LLP

(57) ABSTRACT

A power transmitting device determines transmitting power $P(t1)$ at a beginning of a first unit time, and transmitting power $P(t2)$ at an end of the first unit time, stores a control parameter $Q(t3)$ that determines a voltage of the transmitting power at a beginning of a second unit time, and a control parameter $Q(t4)$ that determines a voltage of the transmitting power at an end of the second unit time, determines a power difference $\Delta P=P(t2)-P(t1)$ and a difference $\Delta Q=Q(t4)-Q(t3)$ in the control parameter Q, and, if the $\Delta P$ is equal to or larger than a first threshold and an absolute value of the $\Delta Q$ is equal to or larger than a second threshold, determines that there is a foreign object between a receiver resonator and a transmitter resonator and decreases the transmitting power output from an inverter circuit.

14 Claims, 8 Drawing Sheets

(56) References Cited

U.S. PATENT DOCUMENTS

| | | | |
|---|---|---|---|
| 2015/0108945 A1* | 4/2015 | Yan | H02J 7/025 320/108 |
| 2015/0365138 A1* | 12/2015 | Miller | H02J 5/005 307/104 |

* cited by examiner

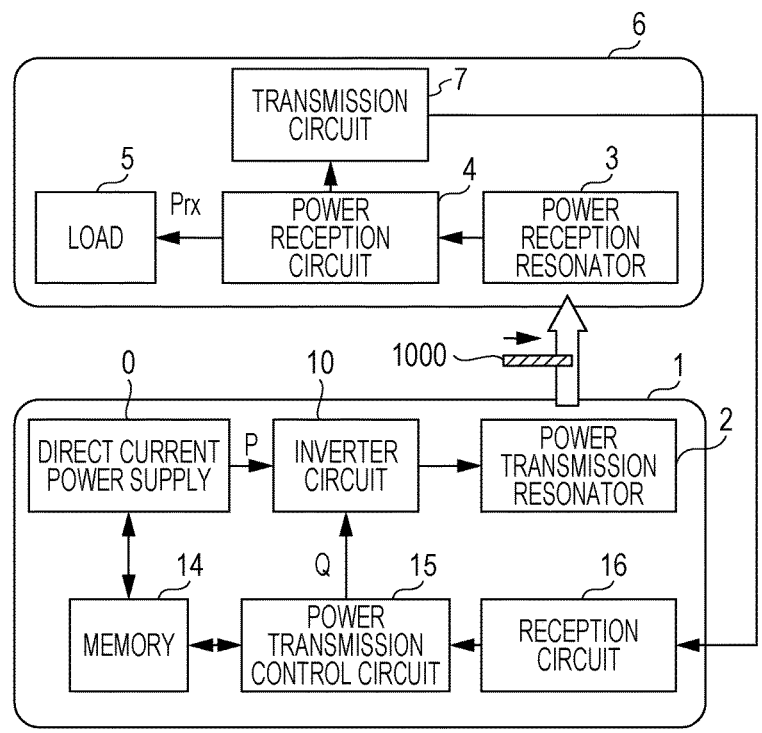
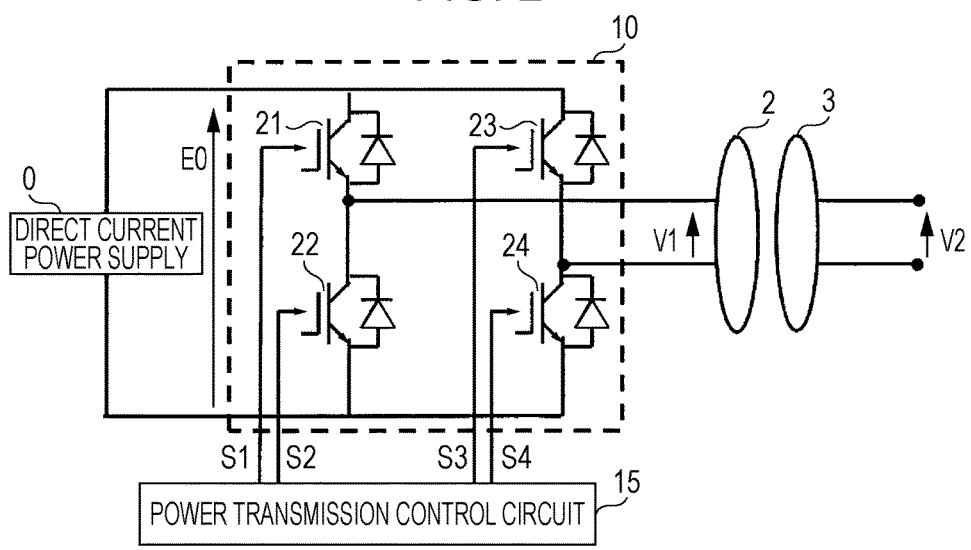

POWER TRANSMITTING DEVICE AND WIRELESS POWER TRANSMISSION SYSTEM

BACKGROUND

1. Technical Field

The present disclosure relates to a power transmitting device that includes a foreign object detecting device for detecting a foreign object between coils and that is used for wireless power transmission, in which power is transmitted wirelessly.

2. Description of the Related Art

During these years, a wireless power transmission technology employing inductive coupling between coils has been developed in order to wirelessly charge electronic devices and electric vehicles (EVs) having mobility, such as mobile phones and electric automobiles. A wireless power transmission system includes a power transmitting device provided with a power transmitting antenna including a power transmitting coil and a power receiving device provided with a power receiving antenna including a power receiving coil. The wireless power transmission system transmits power, without making electrodes directly come into contact with each other, by capturing a magnetic field generated by the power transmitting coil using the power receiving coil.

In U.S. Patent Application Publication No. 2012/0077537, an example of the wireless power transmission system is disclosed.

SUMMARY

In the above example of the related art, however, if a foreign object enters between the power transmitting coil and the power receiving coil, it is difficult to detect the entry of the foreign object without using data regarding receiving power transmitted at relatively long time intervals (e.g., at intervals of several seconds). It is therefore desirable to provide a power transmitting device capable of detecting entry of the foreign object between the coils without using data regarding receiving power.

In one general aspect, the techniques disclosed here feature a power transmitting device that wirelessly transmits transmitting power to a power receiving device including a receiver resonator. The power transmitting device includes a transmitter resonator that is electromagnetically coupled with a receiver resonator and that transmits transmitting power, an inverter circuit that generates the transmitting power to be output to the transmitter resonator, and a power transmission control circuit that adjusts the transmitting power output from the inverter circuit by adjusting a control parameter Q that determines a voltage of the transmitting power based on information indicating a voltage inside the power receiving device, the information being input from the power receiving device. In a state in which a predetermined period of time has elapsed since a beginning of power transmission and the transmitting power has converged within a predetermined range, the power transmission control circuit determines transmitting power $P(t1)$ at a first time $t1$ which is a beginning of a first unit time, and transmitting power $P(t2)$ at a second time $t2$, which is an end of the first unit time. The power transmission control circuit stores a control parameter $Q(t3)$ that determines a voltage of the transmitting power at a third time $t3$, which is a beginning of a second unit time, and a control parameter $Q(t4)$ that determines a voltage of the transmitting power at a fourth time $t4$, which is an end of the second unit time. The power transmission control circuit determines a power difference $\Delta P = P(t2) - P(t1)$ and a difference $\Delta Q = Q(t4) - Q(t3)$ in the control parameter Q. If the power difference $\Delta P$ is equal to or larger than a first threshold and an absolute value of the difference $\Delta Q$ in the control parameter Q is equal to or larger than a second threshold, the power transmission control circuit determines that there is a foreign object between the receiver resonator and the transmitter resonator and decreases the transmitting power output from the inverter circuit. If the power difference $\Delta P$ is smaller than the first threshold or if the absolute value of the difference $\Delta Q$ in the control parameter Q is smaller than the second threshold, the power transmission control circuit determines that there is no foreign object between the receiver resonator and the transmitter resonator and causes the inverter circuit to continue transmitting the same transmitting power.

According to an aspect of the present disclosure, it can be determined whether the foreign object has entered between a power transmitting coil and a power receiving coil without using data regarding receiving power transmitted from a power receiving device at relatively long intervals (e.g., at intervals of several seconds). In addition, a power transmitting device capable of accurately distinguishing a misalignment between the power transmitting coil and the power receiving coil and entry of the foreign object between the power transmitting coil and the power receiving coil can be realized.

It should be noted that general or specific embodiments may be implemented as a system, a method, an integrated circuit, a computer program, a storage medium, or any selective combination thereof.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

BRIEF DESCRIPTION OF THE DRAWINGS

FIG. 1 is a diagram illustrating the configuration of a wireless power transmission system according to a first embodiment of the present disclosure;

FIG. 2 is a diagram illustrating an example of the configuration of an inverter circuit according to the first embodiment of the present disclosure;

DETAILED DESCRIPTION

Figure 3A:
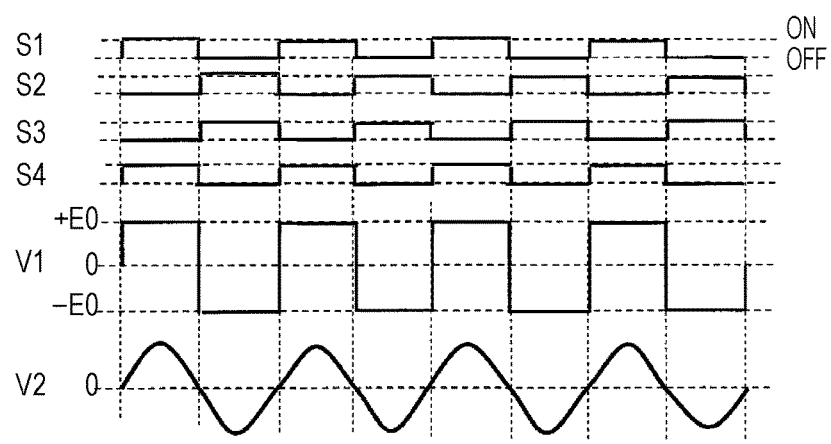
FIG. 3A is a diagram illustrating an example of an operation of the inverter circuit according to the first embodiment of the present disclosure.

Underlying Knowledge Forming Basis of the Present Disclosure

Underlying knowledge forming the basis of the present disclosure will be described before describing embodiments of the present disclosure.

First, the definition of a "foreign object" will be described. In the present disclosure, a "foreign object" refers to an object such as a piece of metal that generates heat due to power transmitted between coils if the object is positioned near a power transmitting coil, a coil for detecting the object, or a power receiving coil in a wireless power transmission system.

The present inventors have found that the following problems arise in the wireless power transmission system described in the above-mentioned example of the related art.

In the wireless power transmission system, if a foreign object enters, such as a piece of metal, between the power transmitting coil and the power receiving coil during power transmission, an overcurrent occurs at the foreign object, and the foreign object might be overheated. In order to perform wireless power transmission safely and efficiently, therefore, a function of detecting the foreign object between the power transmitting coil and the power receiving coil is desirably provided.

In the wireless power transmission system disclosed in U.S. Patent Application Publication No. 2012/0077537, the power receiving device transmits data indicating power Pr1 (hereinafter also referred to as "receiving power") received from the power transmitting device. The power transmitting device detects transmitting power Ps1 at this time. The power transmitting device determines a transmission efficiency η (=receiving power Pr1/transmitting power Ps1) using the receiving power Pr1 and the transmitting power Ps1. If the transmission efficiency η is lower than a predetermined threshold, the power transmitting device determines that a foreign object has entered between the power transmitting coil and the power receiving coil.

Because a transmission efficiency η of 1 indicates an efficiency of 100%, an expression 1−η indicates a decrease ratio of the transmission efficiency η. That is, the meaning of the expression 1−η is substantially the same as that of a power difference ΔP1 (=Ps1−Pr1) between the transmitting power Ps1 and the receiving power Pr1. The above-described method of U.S. Patent Application Publication No. 2012/0077537, therefore, can be considered a method in which it is determined that a foreign object has entered between the power transmitting coil and the power receiving coil if the power difference ΔP1 (=Ps1−Pr1) between the transmitting power Ps1 and the receiving power Pr1 exceeds a predetermined threshold ΔPth1.

On the other hand, most devices that can be wirelessly charged perform power transmission according to a Qi standard established by the Wireless Power Consortium (WPC). In the Qi standard, information (data) indicating receiving power Pr2 detected by a power receiving device is transmitted to a power transmitting device at intervals of several seconds. In addition, data indicating a voltage of receiving power detected by the power receiving device is transmitted to the power transmitting device at intervals of about 250 ms. That is, the power receiving device transmits the data indicating the voltage to the power transmitting device more frequently than the power receiving device transmits the data indicating the receiving power. The "voltage of receiving power" refers to a voltage of power transmitted to the power receiving device (that is, a product of voltage and current). This voltage will also be referred to as a "receiving voltage". In the Qi standard, this voltage is a voltage that has been rectified by a rectifier circuit.

The power transmitting device determines a power difference ΔP2 (=Ps2−Pr2) between transmitting power Ps2 at a time when the power receiving device has detected the receiving power and the resultant receiving power Pr2 at intervals of several seconds. If the power difference ΔP2 exceeds a predetermined threshold ΔPth2, the power transmitting device determines that a foreign object has entered between a power transmitting coil and a power receiving coil.

The power transmitting device adjusts power to be transmitted to the power receiving device such that the receiving voltage transmitted frequently, namely at intervals of 250 ms, converges within a predetermined range (e.g., 5 V±0.04 V) desired by the power receiving device. As a result, the receiving voltage converges within the range desired by the power receiving device at intervals of hundreds of milliseconds to several seconds.

As described above, in the system disclosed in U.S. Patent Application Publication No. 2012/0077537 or a system according to the Qi standard, it is determined whether a foreign object has entered between the power transmitting coil and the power receiving coil using the difference ΔP1 or ΔP2 between the transmitting power and the receiving power.

The present inventors, however, have found that the following problems arise in the conventional method for detecting a foreign object in which the difference ΔP1 or ΔP2 between the transmitting power and the receiving power is used.

There are two principal reasons why the power difference ΔP1 or ΔP2 increases. First, the power difference ΔP1 or ΔP2 increases when the power transmitting coil and the power receiving coil are misaligned. A misalignment means that a positional relationship between the power transmitting coil and the power receiving coil is deviated from a relationship with which satisfactory electromagnetic coupling can be achieved (e.g., a state in which the coils face each other). Second, the power difference ΔP1 or ΔP2 increases when a foreign object has entered, such as a piece of metal, between the power transmitting coil and the power receiving coil.

In the case of the system disclosed in U.S. Patent Application Publication No. 2012/0077537, if a misalignment occurs, electromagnetic coupling between the power transmitting coil and the power receiving coil is reduced, and the receiving power decreases. In this case, the power difference ΔP1 increases. In addition, if a foreign object enters between the power transmitting coil and the power receiving coil, power is consumed by the foreign object, and the receiving power decreases. In this case, too, the power difference ΔP1 increases.

On the other hand, in the case of a system according to the Qi standard, as in the system disclosed in U.S. Patent Application Publication No. 2012/0077537, if a misalignment occurs, or if a foreign object enters between the power transmitting coil and the power receiving coil, the receiving voltage decreases due to the same reason.

Furthermore, in the system according to the Qi standard, the power transmitting device increases the transmitting power in order to offset the decrease in the receiving voltage. As a result, the transmitting power after the occurrence of the misalignment is larger than the transmitting power before the occurrence of the misalignment. Due to the same reason, the transmitting power after the entry of the foreign object between the power transmitting coil and the power receiving coil is larger than the transmitting power before the entry of the foreign object between the power transmitting coil and the power receiving coil.

In the system according to the Qi standard, the receiving voltage is adjusted in such a way as to converge within a range of voltage desired by the power receiving device at intervals of hundreds of milliseconds to several seconds. Accordingly, the receiving power, too, is adjusted in such a way as to be substantially constant at intervals of hundreds of milliseconds to several seconds. As a result, the receiving power after the occurrence of the misalignment becomes substantially the same as the receiving power before the occurrence of the misalignment. Similarly, the receiving power after the entry of the foreign object between the power transmitting coil and the power receiving coil becomes substantially the same as the receiving power before the entry of the foreign object between the power transmitting coil and the power receiving coil.

That is, whereas the receiving power Pr2 remains substantially constant before and after a misalignment occurs, or before and after a foreign object enters between the power transmitting coil and the power receiving coil, the transmitting power Ps2 increases. As a result, the power difference ΔP2 (=Ps2−Pr2) between the transmitting power Ps2 and the receiving power Pr2 increases. Due to this mechanism, the power difference ΔP2 (=Ps2−Pr2) increases regardless of whether a misalignment has occurred or a foreign object has entered between the coils.

The present inventors, however, have found that there are cases in which a power difference ΔPc when a misalignment has occurred and a power difference ΔPo when a foreign object has entered between the coils are substantially the same (ΔPc≈ΔPo) in the system disclosed in U.S. Patent Application Publication No. 2012/0077537 and in a system according to the Qi standard. That is, the present inventors have found a new problem that it might be difficult to distinguish a case in which a misalignment has occurred between the coils and a case in which a foreign object has entered between the coils in the system disclosed in U.S. Patent Application Publication No. 2012/0077537 and in a system according to the Qi standard.

In general, if a misalignment occurs, it is desirable to drive the power receiving device without stopping supplying the transmitting power in consideration of the convenience of the user, insofar as there is no foreign object. On the other hand, if a foreign object enters between the power transmitting coil and the power receiving coil, the foreign object might be overheated, and it is desirable to stop supplying the transmitting power for the sake of safety.

It is therefore desirable that a case in which a misalignment has occurred and a case in which a foreign object has entered between the power transmitting coil and the power receiving coil be distinguished. Otherwise, if a misalignment occurs without a foreign object entering between the coils, for example, the supply of the transmitting power is stopped, which decreases the convenience of the user.

Furthermore, in a system according to the Qi standard, the intervals at which the power transmitting device obtains the receiving power are long, namely several seconds. The power transmitting device might not obtain the receiving power immediately after a foreign object enters between the coils. In this case, a foreign object that has entered between the coils after the power transmitting device determines that there is no foreign object between the power transmitting coil and the power receiving coil and continues transmitting power is not immediately detected. As a result, the foreign object might be overheated.

It is therefore desirable to provide a power transmitting device capable of accurately distinguishing a misalignment between the coils and entry of a foreign object between the coils. In addition, it is desirable to provide a power transmitting device capable of determining whether a foreign object has entered between the coils without using data regarding the receiving power transmitted from the power receiving device at relatively long time intervals (e.g., at intervals of several seconds).

Based on the above examination, the present inventors have conceived aspects that will be described hereinafter.

A power transmitting device according to an aspect of the present disclosure is a power transmitting device that wirelessly transmits transmitting power to a power receiving device including a receiver resonator, the power receiving device comprising:

a transmitter resonator that is electromagnetically coupled with the receiver resonator and that transmits the transmitting power;

an inverter circuit that generates the transmitting power to be output to the transmitter resonator; and a power transmission control circuit that adjusts the transmitting power output from the inverter circuit by adjusting a control parameter that determines a voltage of the transmitting power based on information indicating a voltage inside the power receiving device, the information being input from the power receiving device, wherein, in a state in which a predetermined period of time has elapsed since a beginning of power transmission and the transmitting power has converged within a predetermined range, the power transmission control circuit determines transmitting power $P(t1)$ at a first time $t1$, which is a beginning of a first unit time, and transmitting power $P(t2)$ at a second time $t2$, which is an end of the first unit time, wherein the power transmission control circuit stores a voltage $V(t3)$ of the transmitting power at a third time $t3$, which is a beginning of a second unit time, and a voltage $V(t4)$ of the transmitting power at a fourth time $t4$, which is an end of the second unit time, wherein the power transmission control circuit determines a power difference $\Delta P = P(t2) - P(t1)$ and a voltage difference $\Delta V = V(t4) - V(t3)$, wherein, if the power difference $\Delta P$ is equal to or larger than a first threshold and the voltage difference $\Delta V$ is equal to or larger than a second threshold, the power transmission control circuit determines that there is a foreign object between the receiver resonator and the transmitter resonator and decreases the transmitting power output from the inverter circuit, and wherein, if the power difference ΔP is smaller than the first threshold or if the voltage difference ΔV is smaller than the second threshold, the power transmission control circuit determines that there is no foreign object between the receiver resonator and the transmitter resonator and causes the inverter circuit to continue transmitting the same transmitting power.

If a foreign object does not enter between a power transmitting coil and a power receiving coil and only a misalignment occurs, a change in the impedance (load) of the power transmitting coil is small since there is no foreign object. On the other hand, if a foreign object enters between the power transmitting coil and the power receiving coil, a change in the impedance is larger since the foreign object acts as a load.

It has been found out that, due to these physical properties, even if the power difference ΔP is the same, a change in the impedance (load) is qualitatively larger when a foreign object has entered between the coils than when a misalignment has occurred, and a change in transmitting voltage also increases. Based on this, the present inventors have conceived a method by which occurrence of a misalignment between the coils and entry of a foreign object between the coils can be distinguished using both the power difference ΔP and the difference ΔV in voltage (voltage difference).

According to the above aspect, occurrence of a misalignment between the coils and entry of a foreign object between the coils can be accurately distinguished based on both the power difference ΔP and the voltage difference ΔV, even if the power difference ΔPc when a misalignment has occurred and the power difference ΔPo when a foreign object has entered between the coils are substantially the same (ΔPc≈ΔPo), that is, even if the power difference ΔP is close to a predetermined threshold ΔPth.

Furthermore, since the determination is made based on the power difference ΔP and the voltage difference ΔV in the power transmitting device, for example, data regarding the receiving power transmitted from the power receiving device at long intervals, namely at intervals of several seconds, need not be obtained. By calculating the power difference ΔP and the voltage difference ΔV at intervals (e.g., at intervals of several milliseconds) sufficiently shorter than intervals of several seconds, it can be immediately determined whether a foreign object has entered between the power transmitting coil and the power receiving coil.

Alternatively, the determination may be made using another parameter that determines the voltage V as the control parameter Q instead of the voltage in the power transmitting device. Such a control parameter may be, for example, at least either a parameter that determines an output period ratio of the voltage output from the inverter circuit or the frequency of the voltage. The "output period ratio" refers to a ratio of a period of time for which the voltage is not zero to one period of the voltage. The parameter that determines the output period time can be, for example, a phase difference between two pulse signals output to two switching devices in a full-bridge inverter circuit from the power transmission control circuit or a duty ratio of each pulse signal. In the case of a configuration in which a direct current (DC)-DC converter is connected between a direct current power supply and the inverter circuit, the control parameter Q may be a parameter that determines an output voltage of the DC-DC converter. The control parameter Q can be determined by the power transmission control circuit, for example, based on a difference between the transmitting voltage and the receiving voltage and recorded (stored) in a storage medium such as a memory. Alternatively, the control parameter Q may be a voltage, a frequency, or the like in the power transmitting device measured by a sensor circuit. Specific examples of these modes will be described later.

The embodiments of the present disclosure will be described in detail hereinafter with reference to the drawings. It is to be noted that the embodiments that will be described hereinafter are general or specific examples. Values, shapes, materials, components, arrangement and connection modes of the components, steps, order of the steps, and the like described in the following embodiments are examples, and do not limit the present disclosure. Various aspects described herein can be combined with one another insofar as the combinations do not cause contradictions. In addition, among the components described in the following embodiments, components that are not described in independent claims, which define broadest concepts, are described as arbitrary components. In the following description, components having substantially the same or similar functions are given the same reference numerals, and redundant description thereof might be omitted, First Embodiment Configuration FIG. 1 is a diagram illustrating the configuration of a wireless power transmission system according to a first embodiment of the present disclosure. The wireless power transmission system includes a power transmitting device 1 and a power receiving device 6. The power transmitting device 1 is a device having a function of wirelessly transmitting power. The power transmitting device 1 can be, for example, a charger that performs wireless charging according to the Qi standard. The power transmitting device 1 has a function of detecting a foreign object 1000 that has entered between the power transmitting device 1 and the power receiving device 6. The power receiving device 6 can be an electric machine such as an electronic device or an electric automobile that operates using power received from the power transmitting device 1. In the following description, the power receiving device 6 is assumed to be a mobile information terminal including a secondary battery charged by the power transmitting device 1.

The power transmitting device 1 includes a direct current power supply 0, an inverter circuit 10, a transmitter resonator (power transmission resonator) 2, a power transmission control circuit 15, a memory 14, and a receiving circuit (reception circuit) 16. The power receiving device 6 includes a receiver resonator (power reception resonator) 3, a power receiving circuit (power reception circuit) 4, a load 5, and a transmitting circuit (transmission circuit) 7.

The direct current power supply 0 is a power supply that outputs direct current voltage. The direct current power supply 0 can be a device including an AC (AC)-DC converter that converts commercial AC voltage, for example, into a predetermined direct current voltage. The inverter circuit 10 is a circuit that converts the direct current voltage output from the direct current power supply 0 into AC voltage.

The transmitter resonator 2 and the receiver resonator 3 are each a resonance circuit including a coil and a capacitor. The coil of the transmitter resonator 2 will be referred to as a "power transmitting coil", and the coil of the receiver resonator 3 will be referred to as a "power receiving coil". When the power transmitting coil and the power receiving coil face each other, the power transmitting coil transmits power to the power receiving coil wirelessly. The transmitter resonator 2 and the receiver resonator 3 need not include a capacitor if the capacitor is not necessary. That is, the transmitter resonator 2 and the receiver resonator 3 may use self-resonance of their respective coils.

The power transmission control circuit 15 (hereinafter also referred to simply as a "control circuit 15") is a circuit that controls an operation for transmitting power and an operation for detecting a foreign object performed by the power transmitting device 1. The control circuit 15 is connected to other circuits such as the inverter circuit 10, the receiving circuit 16, and the memory 14. The control circuit 15 can be realized by a combination of a processor such as a central processing unit (CPU) or a microprocessor unit (MPU) that performs control that will be described later and a gate driver that generates control signals to be input to switching devices of the inverter circuit 10. The memory 14 can be a semiconductor memory such as a dynamic random-access memory (DRAM) or a static random-access memory (SRAM). The memory 14 is used for storing control programs to be executed by the control circuit 15 and various pieces of data generated by the control circuit 15.

The power receiving circuit 4 includes a rectifier circuit that converts AC power transmitted from the receiver resonator 3 into direct current power and that supplies the direct current power to the load 5. The power receiving circuit 4 can include a detecting circuit that detects a voltage or the like inside the power receiving device 6 and a control circuit that generates data regarding a voltage and the like to be transmitted from the transmitting circuit 7 and that causes the transmitting circuit 7 to transmit the data.

The transmitting circuit 7 and the receiving circuit 6 are circuits that communicate data. The transmitting circuit 7 of the power receiving device 6 transmits data regarding a voltage or the like inside the power receiving device 6 at predetermined time intervals in accordance with an instruction from the power receiving circuit 4. The receiving circuit 16 of the power transmitting device 1 receives information transmitted from the transmitting circuit 7.

The load 5 is, for example, a secondary battery or a high-capacity capacitor and can be charged by the power receiving circuit 4.

The direct current power input from the direct current power supply 0 is converted by the inverter circuit 10 into AC power and supplied to the transmitter resonator 2. Because of an electromagnetic field caused when the AC power is input to the transmitter resonator 2, the transmitter resonator 2 and the receiver resonator 3 are electromagnetically coupled with each other. As a result, the AC power is supplied from the transmitter resonator 2 to the receiver resonator 3. The transmitted AC power passes to the power receiving circuit 4. The power receiving circuit 4 converts the AC power into direct current power. The direct current power obtained as a result of the conversion performed by the power receiving circuit 4 is supplied to the load 5. In the following description, the AC power transmitted from the power transmitting device 1 will be referred to as "transmitting power", and the power received by the power receiving device 6 will be referred to as "receiving power".

The power receiving circuit 4 transmits data indicating a voltage of the power received by the power receiving circuit 4 to the transmitting circuit 7 at intervals of, for example, about 250 ms. The "voltage of the receiving power" refers to a voltage inside the power receiving device 6 (hereinafter referred to as a "receiving voltage") detected by the power receiving circuit 4. The voltage can be a voltage rectified by the power receiving circuit 4 (hereinafter also referred to as a "rectified voltage"). The receiving circuit 16 of the power transmitting device 1 obtains data indicating a transmitted receiving voltage. Each time data regarding a receiving voltage is obtained (e.g., at intervals of several milliseconds to hundreds of milliseconds), the control circuit 15 adjusts the transmitting power output from the inverter circuit 10 such that the receiving voltage becomes close to a voltage requested by the power receiving device 6 (e.g., 5 V±0.04 V). The control circuit 15 achieves this adjustment by adjusting timings of switching of the plurality of switching devices included in the inverter circuit 10. As a result of the adjustment, the receiving power becomes close to a requested voltage at intervals of, say, several milliseconds to hundreds milliseconds.

FIG. 2 is a diagram illustrating an example of a specific configuration of the inverter circuit 10. The inverter circuit 10 in this example is a full-bridge inverter circuit. As illustrated in FIG. 2, the inverter circuit 10 includes a plurality of switching devices 21, 22, 23, and 24. More specifically, the inverter circuit 10 includes the switching devices 21 and 23 connected to a high-potential side of the direct current power supply 0 and the switching devices 22 and 24 connected to a low-potential side of the direct current power supply 0. These four switching devices 21 to 24 include a first switching device pair (switching devices 21 and 24) that outputs, when closed, a voltage having the same polarity as an input voltage and a second switching device pair (switching devices 22 and 23) that outputs, when closed, a voltage having an opposite polarity to that of the input voltage. Each switching device is closed (turned on) or opened (turned off) in accordance with a control signal (e.g., a pulse signal) input from the control circuit 15.

Each switching device can be a transistor such as an insulated-gate bipolar transistor (IGBT) or a metal-oxide-semiconductor field-effect transistor (MOSFET). Control signals input from the control circuit 15 can be pulse voltage signals input to gates of the switching devices 21 to 24.

If a resonant frequency of the transmitter resonator 2 and the receiver resonator 3 is denoted by f0, an on/off switching frequency of each switching device, that is, a power transmission frequency, can be set to a value close to f0. If the on/off switching frequency of each switching device is changed, the impedance of the transmitter resonator 2 changes. Accordingly, an output voltage V2 of the receiver resonator 3 also changes. The control circuit 15 can therefore change the output voltage V2 of the receiver resonator 3 by changing the on/off switching frequency of each switching device.

FIG. 3A is a diagram illustrating an example of waveforms of control signals S1 to S4 input to the switching devices 21 to 24, respectively, a voltage V1 output from the inverter circuit 10, and the voltage V2 output from the receiver resonator 3. In FIG. 3A, the voltage V2 is a voltage after smoothing is performed by a smoothing capacitor, which is not illustrated. The control signals S1 to S4 are turned on when voltages are relatively high and turned off when the voltages are relatively low. In this example, a phase of the control signal S1 input to the switching device 21 and a phase of the control signal S4 input to the switching device 24 match. Similarly, a phase of the control signal S2 input to the switching device 22 and a phase of the control signal S3 input to the switching device 23 match. The phases of the control signals S1 and S4 are shifted from the phases of the control signals S2 and S3 by half a period. In this example, when the control signals S1 and S4 are on, the voltage V1 is about E0, and when the control signals S2 and S3 are on, the voltage V1 is about −E0. The waveform of the smoothed voltage V2 output from the receiver resonator 3 is sinusoidal.

Figure 3B:
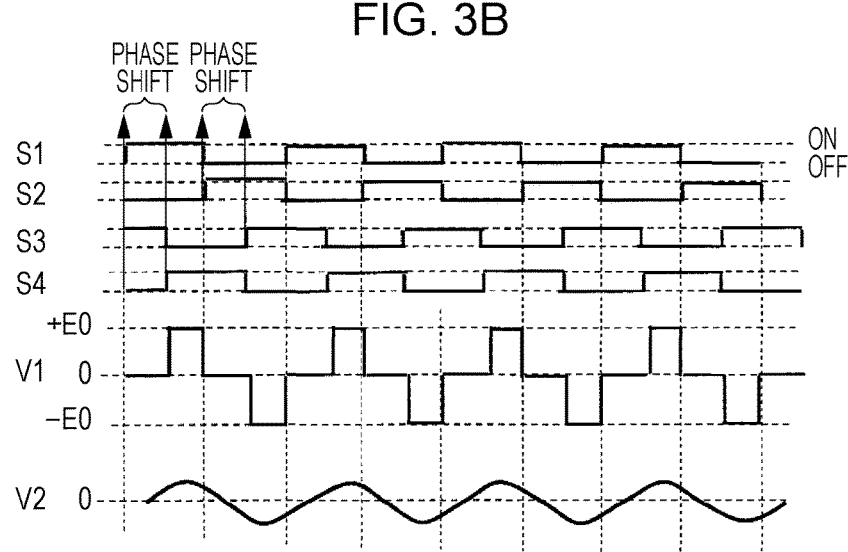
FIG. 3B is a diagram illustrating another example of the operation of the inverter circuit according to the first embodiment of the present disclosure.

FIG. 3B is a diagram illustrating another example of the waveforms of the control signals S1 to S4 and the voltages V1 and V2. In this example, the control signals S1 and S4 are out of phase with each other, and the control signals S2 and S3 are out of phase with each other. As a result, the amplitude of the receiving voltage V2 is lower than in the example illustrated in FIG. 3A. The amount of phase shift (hereinafter also referred to as a "phase shift amount") can vary, but fixed at a quarter of a period in the example illustrated in FIG. 3B. The example illustrated in FIG. 3B is the same as the example illustrated in FIG. 3A in that the phases of the control signals S1 and S2 are opposite to each other and the phases of the control signals S3 and S4 are opposite to each other. By shifting the phase of the control signal S4 from the phase of the control signal S1 and shifting the phase of the phase of the control signal S3 from the phase of the control signal S2, an absolute value of the voltage V1 output from the inverter circuit 10 remains substantially zero (0) for a predetermined period of time, and a period for which the absolute value of the voltage V1 remains about E0 decreases. In other words, an output period ratio of the voltage V1 decreases. The output period ratio refers to a ratio of a period of time for which the absolute value of the voltage V1 remains larger than a predetermined value (e.g., several percent to 20% of the absolute value of amplitude) to one period of the voltage V1. In the example illustrated in FIG. 3A, the output period ratio of the voltage V11 is about 1 (100%), but in the example illustrated in FIG. 3B, the output period ratio of the voltage V1 is about 0.5 (50%). As a result of such a phase shift, the amplitude of the smoothed voltage V2 output from the receiver resonator 3 decreases. Accordingly, a rectified voltage, which is a voltage subjected to the rectification performed by the power receiving circuit 4, also decreases.

The control circuit 15 can adjust the output period ratio of the voltage V1 output from the inverter circuit 10 by adjusting a phase difference between the control signals S1 and S4 and a phase difference between the control signals S2 and S3. As a result of the adjustment, a voltage applied to the load 5 can be adjusted.

The same type of control can be performed by adjusting a duty ratio of each control signal instead of adjusting a phase difference between two control signals. The duty ratio is a ratio of a period of time for which the value remains larger than 0 (or a predetermined value around 0) to one period of each control signal. In the example illustrated in FIG. 3A, the duty ratios of the control signals S1 to S4 are about 0.5. By decreasing the duty radios to 0.25, for example, the same outputs as the voltages V1 and V2 illustrated in FIG. 3B can be obtained. The control circuit 15 can thus control the receiving voltage by controlling the duty ratio of each control signal.

While the power receiving device 6 is operating, the impedance of the load 5 can change depending on an operation state. If the impedance of the load 5 changes, the voltage applied to the load 5 also changes. If it is desirable that the load 5 be driven by a constant voltage, therefore, control needs to be performed such that the receiving voltage achieves a target value. The control circuit 15 in the present embodiment adjusts the above-mentioned power transmission frequency or the phase shift amounts or the duty ratios of the control signals in accordance with a desired receiving voltage. In other words, the control circuit 15 controls the magnitude (that is, amplitude) of the output voltage of the receiver resonator 3 using the on/off switching frequency of each switching device, the phase shift amount of on/off timings, and the duty ratio of each pulse signal that determines the on/off timing as a control parameter Q.

Although the inverter circuit 10 has been described as a full-bridge inverter, a half-bridge inverter including two switching devices and two capacitors may be used, instead. Alternatively, a class E amplifier including one switching device, two inductors, and two capacitors may be used. Even if the half-bridge inverter or the class E amplifier is used, the magnitude of the output voltage of the receiver resonator 3 can be controlled using the power transmission frequency or the duty ratio of each control signal as the control parameter Q as described above.

The control parameter Q is not limited to the above examples, and may be any parameter that can determine the voltage inside the power transmitting device 1 or the voltage inside the power receiving device 6. The control parameter Q may be the transmitting voltage itself.

Figure 4:
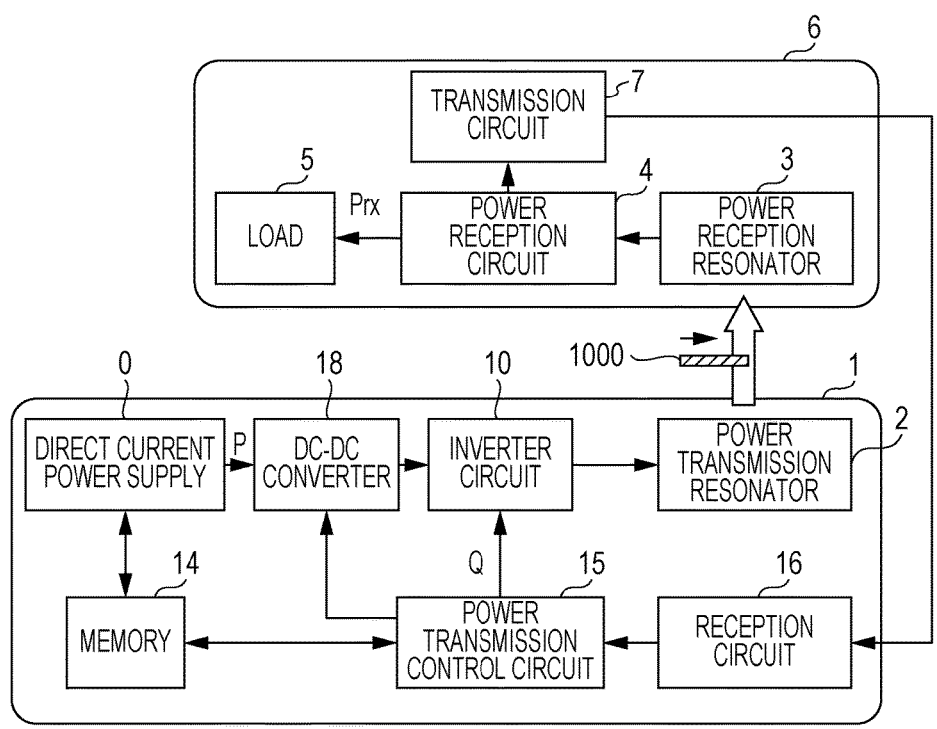
FIG. 4 is a diagram illustrating the configuration of a wireless power transmission system according to a modification of the first embodiment of the present disclosure.

FIG. 4 is a diagram illustrating a modification of the present embodiment. In this modification, a DC-DC converter 18 is connected between the direct current power supply 0 and the inverter circuit 10. The DC-DC converter 18 converts the direct current voltage output from the direct current power supply 0 into a direct current voltage of a different magnitude. In this configuration, the control circuit 15 may control the receiving voltage by controlling a step-up ratio or a step-down ratio of the DC-DC converter 18. This type of control can be achieved by turning on or off a pulse signal input to a switching device included in the DC-DC converter 18. By changing a duty ratio of on and off of the switching device or a frequency, the voltage output from the DC-DC converter 18 can be changed. Accordingly, the voltage output from the inverter circuit 10 also changes.

In this modification, the control parameter Q can be the frequency or the duty ratio of a control signal for controlling the DC-DC converter 18. Alternatively, the voltage itself output from the DC-DC converter 18 may be used as the control parameter Q.

Mechanism for Detecting Foreign Object

Next, a process for detecting a foreign object according to the present embodiment will be specifically described.

The power transmitting device 1 according to the present embodiment detects a foreign object based on a power difference ΔP in transmitting power at different times and a difference ΔQ in the control parameter Q that determines the voltage, not the power difference ΔP2 between transmitting power and receiving power used in the above-described Qi system. More specifically, when a predetermined period of time has elapsed since a beginning of power transmission and the transmitting power has converged within a predetermined range, the control circuit 15 performs the following process.

(1) The control circuit 15 determines a transmitting power P(t1) at a first time t1, which is a beginning of a first unit time, and a transmitting power P(t2) at a second time t2, which is an end of the first unit time.

(2) The control circuit 15 stores (e.g., in the memory 14 or the like) a control parameter Q(t3), which determines the voltage of the transmitting power at a third time t3, which is a beginning of a second unit time, and a control parameter Q(t4), which determines the voltage of the transmitting power at a fourth time t4, which is an end of the second unit time, (3) The control circuit 15 determines the power difference ΔP=P(t2)−P(t1) and the difference ΔQ=Q(t4)−Q(t3) in the control parameter Q.

(4) If the power difference ΔP is equal to or larger than a first threshold and an absolute value of the difference ΔQ in the control parameter Q is equal to or larger than a second threshold, the control circuit 15 determines that there is a load (that is, a foreign object) between the receiver resonator 3 and the transmitter resonator 2 and causes the inverter circuit 10 to decrease the transmitting power.

(5) If the power difference ΔP is smaller than the first threshold or if the absolute value of the difference ΔQ in the control parameter Q is smaller than the second threshold, the control circuit 15 determines that there is no load between the receiver resonator 3 and the transmitter resonator 2 and causes the inverter circuit 10 to continue transmitting the same transmitting power.

In (2), the second unit time may be different from or the same as the first unit time. In the following description, the second unit time is assumed to be the same as the first unit time (that is, t3=t1 and t4=t2) for the sake of convenience. In (4), an operation for decreasing the transmitting power includes an operation for stopping the power transmission (that is, an operation for decreasing the transmitting power to 0).

There are two principal reasons why the power difference ΔP in transmitting power is caused at different times. First, the power difference ΔP is caused when a misalignment has been caused between the power transmitting coil and the power receiving coil. Second, the power difference ΔP is caused when a foreign object has entered between the power transmitting coil and the power receiving coil.

Figure 5A:
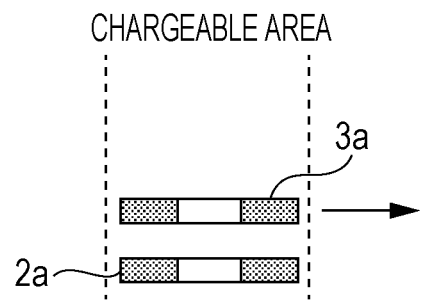
FIG. 5A is a schematic diagram illustrating arrangement of a power transmitting coil and a power receiving coil according to the first embodiment of the present disclosure.
Figure 5B:
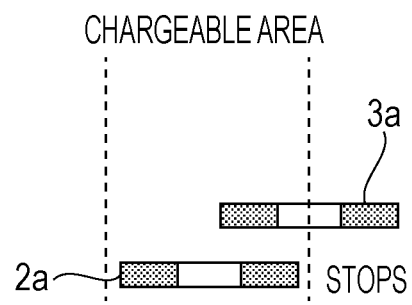
FIG. 5B is a schematic diagram illustrating arrangement of the power transmitting coil and the power receiving coil according to the first embodiment of the present disclosure.

FIGS. 5A and 5B are diagrams schematically illustrating an example of a positional relationship between a power transmitting coil 2a and a power receiving coil 3a before and after a misalignment, which is the first reason, occurs. In an initial state illustrated in FIG. 5A, the power receiving device 6 is stationary on a charging platform (that is, a stand) included in the power transmitting device 1. In this state, a central axis of the power receiving coil 3a is positioned at the center of a chargeable area defined by an outermost periphery of the power transmitting coil 2a. That is, the power transmitting coil 2a and the power receiving coil 3a face each other. It is assumed that the power receiving coil 3a slides in a direction perpendicular to the central axis thereof. As illustrated in FIG. 5B, the power receiving coil 3a stops when the central axis thereof reaches an edge of the chargeable area.

Figure 5C:
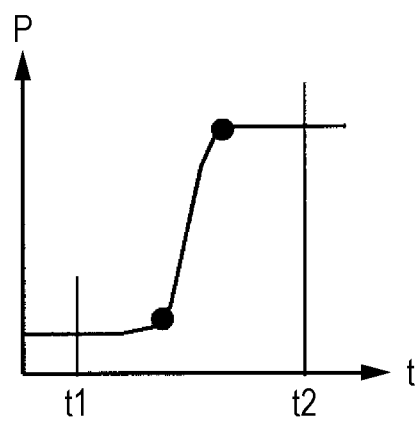
FIG. 5C is a diagram illustrating a temporal change in transmitting power according to the first embodiment of the present disclosure.

FIG. 5C is a diagram illustrating an example of a temporal change in transmitting power P when the power receiving coil 3a moves from the position illustrated in FIG. 5A to the position illustrated in FIG. 5B. As a result of the movement of the power receiving coil 3a, a coupling coefficient between the power transmitting coil 2a and the power receiving coil 3a decreases. The power received by the power receiving coil 3a accordingly decreases, and the receiving voltage also decreases. The control circuit 15 of the power transmitting device 1 increases the transmitting voltage and the transmitting power P in order to offset the decrease in receiving voltage. As a result, as illustrated in FIG. 5C, the transmitting power P simply increases over time while the power receiving coil 3a is sliding. After the power receiving coil 3a stops, the coupling coefficient becomes constant, and the transmitting power P settles at a predetermined value.

The transmitting power P can be a value, for example, obtained by measuring the power output from the direct current power supply 0 illustrated in FIG. 1. Alternatively, the transmitting power P may be a value obtained by measuring another portion of the power transmitting device 1, such as a value obtained by measuring power output from the inverter circuit 10. Similarly, a transmitting voltage V used for a process that will be described later may be a value obtained by measuring an arbitrary portion of the power transmitting device 1, such as a voltage output from the direct current power supply 0 or a voltage output from the inverter circuit 10 illustrated in FIG. 1. The transmitting power P and the transmitting voltage V may be measured by the inverter circuit 10 or the control circuit 15, or may be measured by a dedicated measuring device.

The first time t1 illustrated in FIG. 5C is a time before the power receiving coil 3a begins to move but after the power transmitting device 1 is turned on and the transmitting power converges within the predetermined range. The second time t2 is a time after a predetermined period of time has elapsed since the first time t1, and the power receiving coil 3a stops, and then the amount of change in transmitting power in unit time converges within a predetermined range (e.g., 0.1 W/s). That is, the first time t1 and the second time t2 are set such that a period between the first time t1 and the second time t2 includes sharp changes in the power P indicated by solid circles in FIG. 5C. In other words, the times t1 and t2 are set such that a whole profile of the transmitting power that changes as the power receiving device 6 moves is included.

After obtaining the transmitting power P(t1) at the first time t1 and the transmitting power P(t2) at the second time t2, the control circuit 15 determines the power difference ΔP=P(t2)−P(t1) from the transmitting power P(t1) and the transmitting power P(t2). Since P(t2)>P(t1) in the example illustrated in FIG. 5C, ΔP>0.

Now, a relationship between the power difference ΔP in the present embodiment and the power difference ΔP2 in the above-described Qi system will be described.

In the present embodiment, if the coils are misaligned, the receiving voltage temporarily decreases, but the transmitting power P is increased to adjust the receiving voltage to a desired value of the power receiving device 6. Similarly, the receiving power temporarily decreases after the coils are misaligned, but is adjusted in such a way as to be substantially the same as one before the misalignment occurs. The amount of increase ΔP in the transmitting power P is therefore equal to the amount of decrease in receiving power due to a misalignment. This mechanism also holds in the Qi system.

The power difference ΔP (=P(t2)−P(t1)) in the transmitting power P in the present embodiment is therefore equal to the power difference ΔP2 (=Ps2−Pr2) between the transmitting power Ps2 and the receiving power Pr2 determined in the Qi system.

On the other hand, if a foreign object enters between the power receiving coil 3a and the power transmitting coil 2a, too, the receiving power temporarily decreases and is then adjusted to offset the decrease as in the case of a misalignment. As a result, P(t2)>P(t1), and ΔP>0.

By setting a predetermined threshold ΔPth, therefore, it can be determined whether a foreign object has entered between the power transmitting coil and the power receiving coil based on whether ΔP>ΔPth. If a foreign object enters between the power transmitting coil and the power receiving coil, overheat might be caused, and the supply of the transmitting power, for example, is stopped for the sake of safety.

Because the inequality ΔP>ΔPth can also be satisfied if a misalignment occurs, however, it might be erroneously determined that a foreign object has entered between the coils. If it is erroneously determined that a foreign object has entered between the coils when, in fact, a misalignment has occurred, the transmission of power is undesirably stopped for the sake of safety. In the case of a misalignment, it is usually desirable that the supply of the transmitting power is not stopped and the power receiving device 6 is kept being driven in consideration of the convenience of the user. It is difficult, however, for the control based only on ΔP to achieve such an operation.

If there is no difference between the power difference ΔPc due to a misalignment and the power difference ΔPo due to a foreign object between the power transmitting coil and the power receiving coil, it is difficult to distinguish occurrence of a misalignment between the coils and entry of a foreign object between the coils even if the threshold ΔPth is provided.

In general, ΔPo>ΔPc in most cases. This is because of the following.

Figure 6:
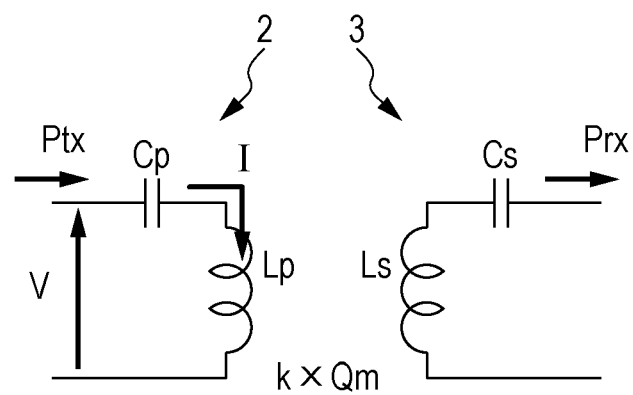
FIG. 6 is an equivalent circuit diagram of a transmitter resonator and a receiver resonator according to the first embodiment of the present disclosure.

FIG. 6 is an equivalent circuit diagram of the transmitter resonator 2 and the receiver resonator 3 for describing a mechanism for detecting a foreign object in the present disclosure. In the example illustrated in FIG. 6, the transmitter resonator 2 is a series resonant circuit including a coil Lp and a capacitor Op, and the receiver resonator 3 is a series resonant circuit including a coil Ls and a capacitor Cs. The transmitter resonator 2 and the receiver resonator 3 are not limited to this example, and may be parallel resonant circuits.

Here, the transmitting power is denoted by Ptx, the receiving power is denoted by Prx, the coupling coefficient between the power transmitting coil Lp and the power receiving coil Ls is denoted by k, and a geometric mean of the control parameter Q for the power transmitting coil Lp and the power receiving coil Ls is denoted by Qm. In this case, the receiving power Prx can be represented by the following expression (1), $$Prx \approx [1-2/(k \times Qm)] \times Ptx \quad (1)$$

It can be seen from expression (1) that the receiving power decreases if at least either the coupling coefficient k or the geometric mean Qm decreases due to occurrence of a misalignment or entry of a foreign object. In this case, the control circuit 15 changes the control parameter Q in such a way as to increase the transmitting power and offset the decrease.

If a misalignment occurs, the coupling coefficient k between the power transmitting coil Lp and the power receiving coil Ls mainly decreases. On the other hand, if a foreign object enters between the power transmitting coil Lp and the power receiving coil Ls, the coupling coefficient k decreases due to an interrupted magnetic field and the geometric mean Qm decreases due to the entry of the foreign object.

The amount of decrease in receiving power, therefore, is larger when a foreign object has entered than when a misalignment has occurred. That is, the amount of increase in transmitting power tends to be larger when a foreign object has entered than when a misalignment has occurred.

The present inventors, however, have found that the power difference ΔPc due to occurrence of a misalignment and the power difference ΔPo due to entry of a foreign object between the coils can be substantially the same (ΔPc≈ΔPo). In this case, it is difficult to determine whether a misalignment has occurred or a foreign object has entered between the coils.

As a result of an examination of a method for solving this new problem, the present inventors have found the following. That is, even if the difference ΔPc in transmitting power due to occurrence of a misalignment and the difference ΔPo in transmitting power due to entry of a foreign object between the coils are the same, there can be a difference in the transmitting voltage V.

This phenomenon will be described, though qualitatively, hereinafter with reference to Table.

TABLE

| | Misalignment | | Foreign Object | |
|---|---|---|---|---|
| P(t1) | 1 W = 1 V × 1 A | 1 Ω | 1 W = 1 V × 1 A | 1 Ω |
| P(t2) | 2.25 W = 1.5 V × 1.5 A | 1 Ω | 2.25 W = 2.25 V × 1 A | 2.25 Ω |
| Power difference ΔP | ΔPc = 1.25 W | — | ΔPo = 1.25 W | — |

Table indicates an example of the transmitting powers P(t1) and P(t2) and the power difference ΔP at a time when a misalignment has occurred and at a time when a foreign object has entered. More specifically, Table indicates changes in the transmitting voltage V, current I, and impedance R (=V/I) of the power transmitting coil at a time when the power difference ΔPc has become 1.25 W due to occurrence of a misalignment and at a time when a foreign object has entered between the power transmitting coil and the power receiving coil.

The power difference ΔP in transmitting power is represented by the following expression (2).

$$\text{Power difference } \Delta P = P(t2)-P(t1)=V(t2) \times I(t2)-V(t1) \times I(t1)=[V(t2)]^2/[R(t2)]-[V(t1)]^2/[R(t1)] \quad (2)$$

If, as indicated in Table, the transmitting power P(t1) is the same, namely, for example, 1 W, between when a misalignment has occurred and when a foreign object has entered, $[V(t1)]^2/[R(t1)]$ is the same based on a right side of expression (2). In general, the transmitting power P(t1) before a misalignment occurs or a foreign object enters is smaller than the transmitting power P(t2) after the misalignment occurs or the foreign object enters. Compared to the transmitting power P(t2), the transmitting power P(t1) before a misalignment occurs and the transmitting power P(t1) before a foreign object enters are substantially the same.

The power difference ΔP thus changes in accordance with a change in $[V(t2)]^2/R(t2)$.

Since the two cases in which the power difference ΔP is the same are compared with each other here, however, $[V(t2)]^2/R(t2)$ is the same based on the right side of expression (2). In this case, V(t2) increases as R(t2) increases, since V(t2) changes such that $[V(t2)]^2/R(t2)$ remains the same.

In the example indicated by Table, the impedance R(t2) in the case of occurrence of a misalignment is 1Ω. On the other hand, the impedance R(t2) in the case of entry of a foreign object is 2.25Ω. The impedance R(t2) is thus larger when a foreign object has entered than when a misalignment has occurred.

If the power difference ΔP is the same, therefore, V(t2) is larger when a foreign object has entered (2.25 V) than when a misalignment has occurred (1.5 V).

When R(t2) increases, a change from R(t1) to R(t2), that is, a change in the impedance R of the power transmitting coil, also increases. In addition, when V(t2) increases, a change from V(t1) to V(t2), that is, a change in the transmitting voltage V, also increases.

That is, if a misalignment occurs, a change in the impedance of the power transmitting coil is small because there is no foreign object between the power transmitting coil and the power receiving coil. On the other hand, if a foreign object enters, a change in impedance is large because the foreign object between the power transmitting coil and the power receiving coil acts as a load.

Due to these physical properties, even if the power difference ΔP is the same, a change in the impedance R is qualitatively larger when a foreign object has entered between the coils than when a misalignment has occurred, and a change in the transmitting voltage V (also referred to simply as a difference ΔV in voltage) also increases.

Based on this, the present inventors have used both the power difference ΔP and the difference ΔV in voltage as parameters and found a method for accurately determining whether a misalignment has occurred between the power transmitting coil and the power receiving coil or a foreign object has entered between the power transmitting coil and the power receiving coil.

Here, the difference ΔQ in the control parameter Q that determines the transmitting voltage V and the difference ΔV in transmitting voltage have one-to-one correspondence. The difference ΔQ in the control parameter Q can therefore be replaced by the difference ΔV in transmitting voltage.

By using both the power difference ΔP and the difference ΔQ in the control parameter Q as parameters as described above, it can be accurately determined whether a misalignment has occurred or a foreign object has entered.

Figure 7:
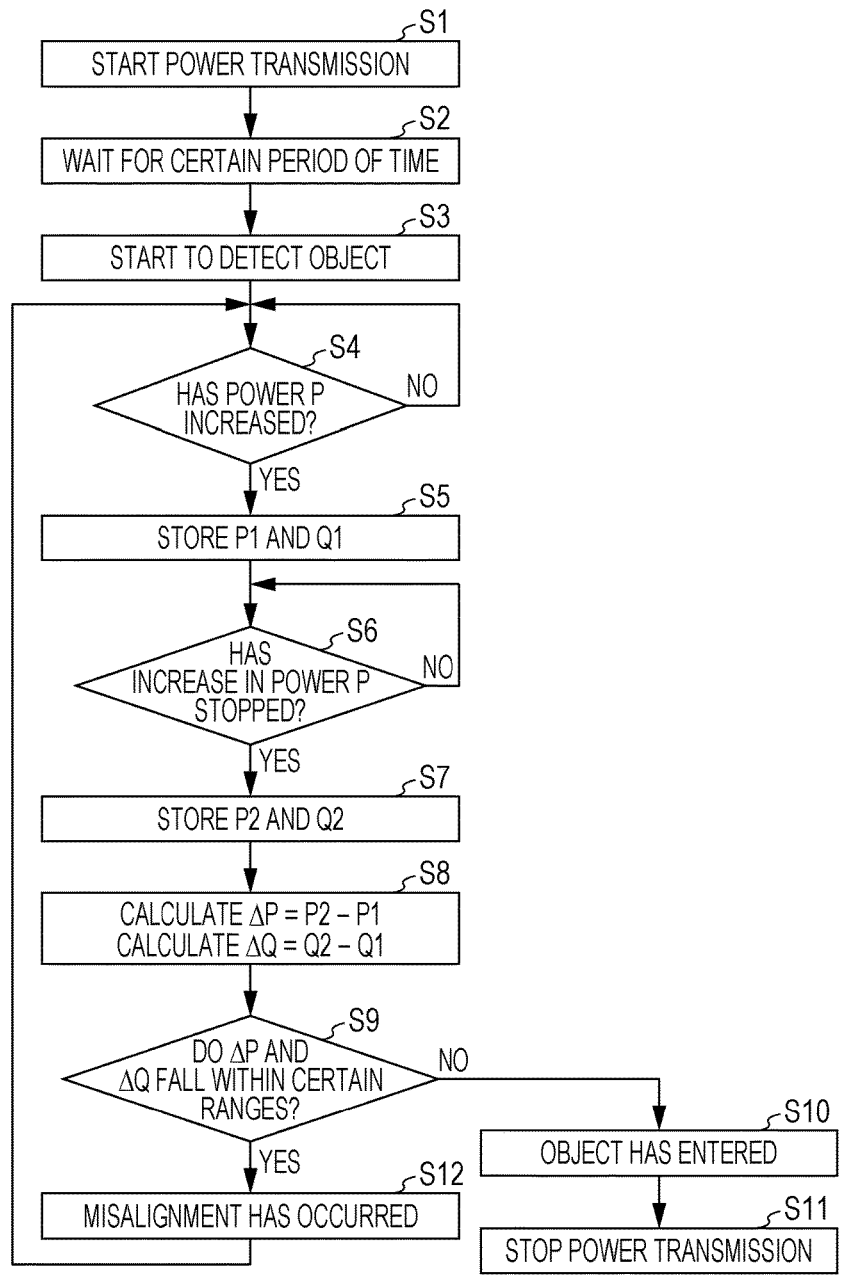
FIG. 7 is a flowchart illustrating an operation according to the first embodiment of the present disclosure.

Flowchart of Operation for Distinguishing Occurrence of Misalignment and Entry of Object FIG. 7 is a flowchart illustrating an example of an operation for distinguishing occurrence of a misalignment and entry of a foreign object according to the present embodiment. The operation for distinguishing occurrence of a misalignment and entry of a foreign object according to the present embodiment will be described with reference to FIG. 7.

First, the control circuit 15 receives, from the user, an instruction to start power transmission and reads, from the memory 14, an initial value of the control parameter Q (e.g., power transmission frequency: 100 kHz or phase difference: 170°) that determines the transmitting voltage. The control circuit 15 then starts the power transmission using the initial value of the control parameter Q (step S1).

The instruction to start power transmission issued by the user can be, for example, a signal transmitted to the control circuit 15 by the user by turning on the direct current power supply 0. Alternatively, the instruction can be a power transmission trigger transmitted to the control circuit 15 when the power receiving device 6 (terminal) including the receiver resonator 3, the power receiving circuit 4, and the load 5 is put on the charging platform of the power transmitting device 1. Alternatively, the instruction may be a signal transmitted to the control circuit 15 after alignment of the power transmitting coil and the power receiving coil is completed.

After beginning the power transmission, the control circuit 15 adjusts the control parameter Q, while transmitting power, such that the voltage output to the load 5 becomes constant as described above. The control circuit 15 then waits until the transmitting power converges within a predetermined range and a steady state is established (step S2). This prevents erroneous detection of a foreign object in a process for detecting a foreign object due to initial changes in voltage and power after the power transmission starts.

The process for detecting a foreign object then starts (step S3). In the process for detecting a foreign object, the control circuit 15 sequentially stores data regarding the transmitting power P(t) at sampling intervals Δt. Since a storage area is limited, however, only data 10 seconds ago and newer is stored, for example, by determining Δt as 1 second and the number of array elements as 10. By storing only data in a predetermined period, a memory area used can be reduced. Each time the control circuit 15 stores data, the control circuit 15 determines whether the transmitting power P(t) has increased (step S4). If the transmitting power P(t) has increased, the control circuit 15 determines a time immediately before the increase as the first time t1 and stores the transmitting power P(t1) as a variable P1 and Q(t1) as a variable Q1 (step S5). At this point of time, it is difficult for the control circuit 15 to determine whether a foreign object has entered or a position of the terminal has changed.

Next, a process for detecting a steady state starts (step S6). In the process for detecting a steady state, the control circuit 15 determines whether temporal changes in the transmitting power P(t) have become sufficiently small. If a foreign object enters between the power transmitting coil and the power receiving coil, the transmitting power temporarily increases, but after the foreign object becomes stationary between the coils, the increase in the transmitting power soon stops and enters a steady state. That is, temporal changes in the transmitting power P(t) become small. The control circuit 15 determines this point of time as the second time t2 and stores P(t2) as a variable P2 and Q(t2) as a variable Q2 (step S7).

After the above process is completed, a power difference before and after entry of a foreign object between the coils or occurrence of a misalignment between the coils can be determined using the variables P2 and P1. In addition, a difference in the control parameter Q before and after the entry of the foreign object between the coils or the occurrence of the misalignment between the coils can be determined using the variables Q2 and Q1. The control circuit 15 determines ΔP=P2−P1 and ΔQ=Q2−Q1 (step S8).

Next, a foreign object determination process starts (step S9). In the foreign object determination process, if at least either ΔP or ΔQ converges within a corresponding predetermined range, the control circuit 15 determines that a misalignment has occurred (step S12). In this case, the process returns to step 54 and the power transmission continues. On the other hand, if both ΔP and ΔQ fall out of the corresponding predetermined ranges, the control circuit 15 determines that a foreign object has entered (step S10). In this case, the control circuit 15 stops the power transmission (step S11).

The transmitting power P in the steady state can differ depending on a type of power receiving terminal. The behavior of the control parameter Q can also differ depending on the degree of misalignment and entry of a foreign object. The determination may therefore be made using the following normalized evaluation parameters X and Y, which are obtained by dividing ΔP and ΔQ by P(t1) and Q(t1), respectively, at the time t1.

$$X = \Delta P / P(t1)$$

$$Y = \Delta Q / Q(t1)$$

X will be referred to as a first evaluation parameter, and Y will be referred to as a second evaluation parameter. Variation in the control parameter Q due to the type of terminal or differences in the degree of a misalignment or entry of a foreign object can be suppressed using these evaluation parameters, thereby further reducing the possibility of erroneous detection. Details of this effect will be described in a later example.

Although an example in which the control parameter Q that determines the transmitting voltage V is used has been described in the present embodiment, the transmitting voltage V itself may be used, instead, as described above. In this case, too, occurrence of a misalignment between the coils and entry of a foreign object between the coils can be distinguished through the same process.

As described above, according to the present embodiment, occurrence of a misalignment between the coils and entry of a foreign object between the coils are evaluated using the difference $\Delta P$ in the transmitting power P and the difference $\Delta V$ in the transmitting voltage V or the difference $\Delta Q$ in the control parameter Q. As a result, it can be accurately determined whether a misalignment has occurred between the coils or a foreign object has entered between the coils even when the power difference $\Delta Pc$ at a time when a misalignment has occurred and the power difference $\Delta Po$ at a time when a foreign object has entered between the power transmitting coil and the power receiving coil are substantially the same ($\Delta Pc \approx \Delta Po$), that is, even when the difference $\Delta P$ in the transmitting power P is close to the predetermined threshold $\Delta Pth$.

In the method for detecting a foreign object according to the present embodiment, since the power transmitting device 1 determines the difference $\Delta P$ in the transmitting power P and the difference $\Delta V$ in the transmitting voltage V or the difference $\Delta Q$ in the control parameter Q, data regarding the receiving power need not be obtained from the power receiving device 6. That is, there is no temporal limitation (e.g., a waiting time of up to several seconds) in obtaining data regarding the receiving power. The power transmitting device 1 can therefore arbitrarily set the first time t1 and the second time t2. It can therefore be determined in a timely manner whether a foreign object has entered between the power transmitting coil and the power receiving coil.

Second Embodiment

Figure 8:
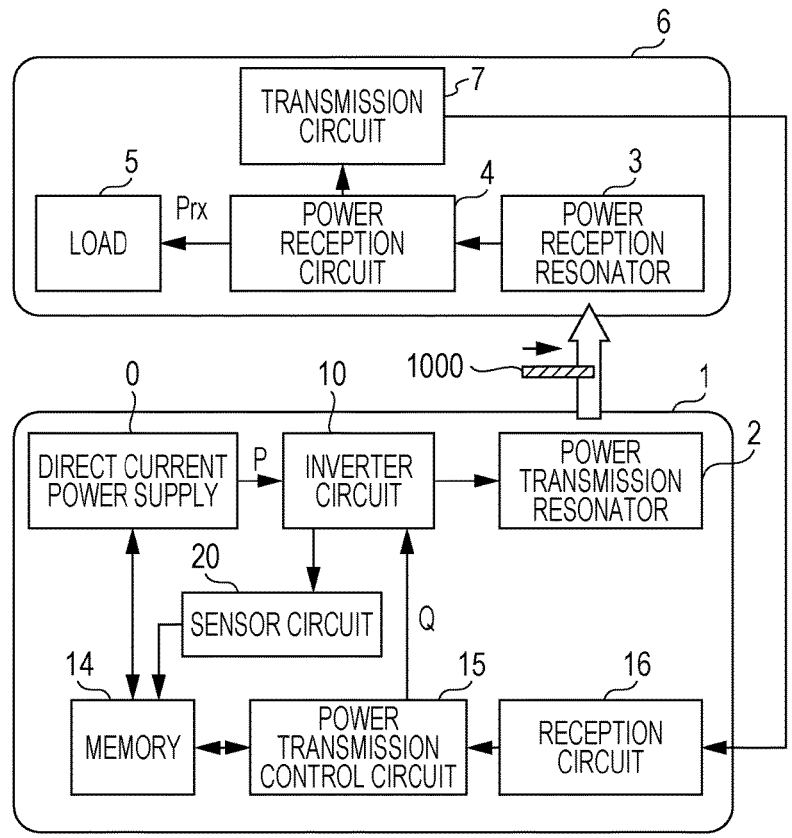
FIG. 8 is a diagram illustrating the configuration of a wireless power transmission system according to a second embodiment of the present disclosure.

FIG. 8 is a schematic configuration diagram illustrating a wireless power transmission system according to a second embodiment. The second embodiment is different from the first embodiment in that the power transmitting device 1 includes a sensor circuit 20 (also simply referred to as a "sensor") that measures the control parameter Q.

In the first embodiment, the control circuit 15 changes an output waveform of the inverter circuit 10 by changing the control parameter Q. As described above, the control parameter Q can be, for example, either a parameter that determines the output period ratio of the transmitting voltage output from the inverter circuit 10 or a frequency. The parameter that determines the output period ratio of the transmitting power can be, for example, a phase difference between two pulse signals output to the inverter circuit 10 from the control circuit 15 or a duty radio of each pulse signal.

There can be, however, a case in which the inverter circuit 10 is affected by noise or ambient temperature and operates at a voltage different from a target voltage, even if the control parameter Q is changed such that the transmitting voltage reaches a target value.

In the second embodiment, the sensor circuit 20 that measures the control parameter Q is provided inside the power transmitting device 1 and measures actual values of the control parameter Q. In doing so, an accurate amount of change in the control parameter Q when a foreign object has entered can be stored (e.g., in the memory 14).

If an output of the sensor circuit 20 is denoted by S(t), the control circuit 15 according to the present embodiment determines a difference $\Delta S = S(t2) - S(t1)$ in sensor output based on a sensor output S(t1) at the first time t1 and a sensor output S(t2) at the second time t2. By replacing the above-described difference $\Delta Q$ in the control parameter Q with the difference $\Delta S$ in the sensor output, it can be accurately determined whether a misalignment has occurred between the power transmitting coil and the power receiving coil or a foreign object has entered between the power transmitting coil and the power receiving coil. In addition, it can be determined in a timely manner whether a foreign object has entered between the power transmitting coil and the power receiving coil.

As described above, the sensor output S in the steady state can differ depending on the type of power receiving terminal. The determination may therefore be made using a normalized evaluation parameter $Z = \Delta S / S(t1)$. In doing so, changes in the control parameter Q depending on the type of terminal can be suppressed, thereby reducing the possibility of erroneous detection.

Other Embodiments

The above-described times t1 and t2 (t3 and t4) at which the power P, the control parameter Q, and the like are obtained may be dynamically changed. In doing so, detection accuracy can be further improved. In the power transmitting device 1 according to the first or second embodiment, a time at which a difference between the receiving power received by the receiving circuit 16 from the power receiving device 6 and a target value becomes smaller than a predetermined value may be determined as the second time t2. In this case, the amount of increase in the receiving power due to an increase in the transmitting power can be certainly evaluated, thereby improving the detection accuracy. In addition, a time before a time at which the difference between the receiving power received from the power receiving device 6 and the target value becomes larger than a predetermined value may be determined as the first time t1. In this case, when a change in power is small, the possibility of erroneous detection in the process for detecting a foreign object can be reduced.

If the power transmission is stopped after a foreign object is detected, the user's safety can be assured, but after the power transmission is resumed, heat might be undesirably generated again. This can be avoided by, after the power transmitting device 1 according to the first or second embodiment of the present disclosure detects the foreign object, storing a determination flag indicating the detection of the foreign object in the memory 14 or the like and keeping the power P(t2) and the control parameter Q(t2) in the memory 14. Since data indicating the past presence of a foreign object is stored in the memory 14, the power transmission is not resumed after being stopped unless the foreign object is removed. In this case, the user's safety can be assured. Should the power transmission be resumed without the foreign object being removed, it can be determined whether the foreign object still remains between the coils by referring to the data stored after the power transmission is stopped and comparing the data with P(t) and Q(t) at the time of the resumption. As a result, a process for stopping power transmission can be performed immediately after the resumption, thereby reducing a risk of heat generation.

Figure 9:
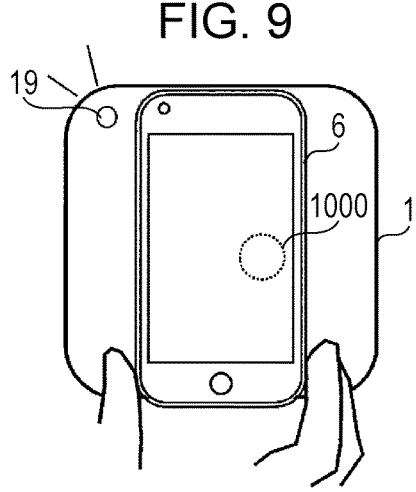
FIG. 9 is a diagram illustrating an example of a power transmitting device including a display unit.

Since the distribution of magnetic fields is invisible, a display unit (light-emitting diode (LED), a liquid crystal display, or the like) may be provided for the power transmitting device 1 or the power receiving device 6. If the power transmission is stopped, a state of the display unit may be changed to notify the user of a danger. As illustrated in FIG. 9, for example, the power transmitting device 1 may further include a display unit 19 (a lamp such as an LED). In this example, if a foreign object is detected and the power transmission is stopped, the power transmission control circuit 15 changes a display state (e.g., color or brightness) of the display unit 19. As a result, the user can notice that a foreign object has entered, which improves safety. A display state of a display unit (e.g., a lamp such as an LED or a display) of the power receiving device 6, instead of the display unit 19, may be changed. Alternatively, a speaker included in the power transmitting device 1 or the power receiving device 6 may output audio information to notify the user of presence of a foreign object.

EXAMPLE

Next, an example of the present disclosure will be described.

With a state in which a power transmitting coil (outer dimensions of 12 mm×50 mm) and a power receiving coil faced each other regarded as an initial state, the power difference ΔP and the voltage difference ΔV were measured 1) in cases where the power transmitting coil and the power receiving coil were horizontally 0 mm, 6 mm, and 12 mm away from each other and 2) in cases where a foreign object entered between the power transmitting coil and the power receiving coil under six different conditions described below.

Power receiving coils of different shapes and states of charge, namely an A-type coil (φ32 mm and state of charge (SOC)=40%), a B-type coil (φ32 mm and SOC=60%), and a C-type coil (40×30 mm and SOC=70%), were prepared. As described above, a normalization process was performed to reduce individual differences between terminals. A piece of iron of 15 mm in diameter and an aluminum ring of 22 mm in diameter were used as metal objects. The SOC indicates the amount of charge remaining. Energy transmitted between the coils is ultimately consumed by a battery. A load resistance of the battery changes depending on the amount of charge remaining. In the present example, therefore, data obtained with different SOCs will be presented in order to prove that the determination method in the present example can be applied even if the load resistance of the battery changes.

Figure 10:
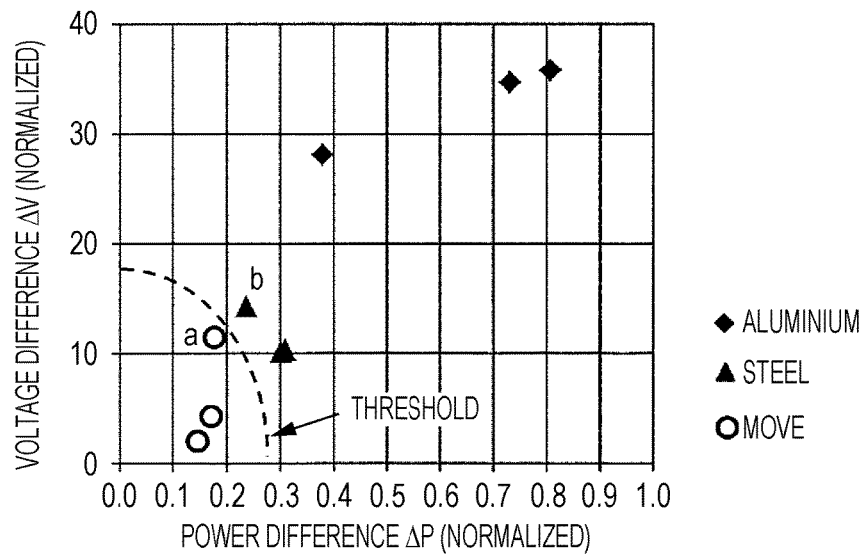
FIG. 10 is a diagram illustrating an example of the present disclosure in which a threshold is determined using an elliptic equation.

FIG. 10 illustrates results of measurement. In FIG. 10, "move" indicates results at a time when a misalignment has occurred, "steel" indicates results at a time when a foreign object (piece of iron) has entered, and "aluminum" indicates result at a time when a foreign object (aluminum ring) has entered. A horizontal axis represents the normalized power difference ΔP, and a vertical axis represents the normalized voltage difference ΔV.

As described above, qualitatively, the power difference ΔP when a misalignment has occurred is often smaller than the power difference ΔP when a foreign object has entered. It is therefore basically possible to determine that a misalignment has occurred if ΔP<0.2, for example, and that a foreign object has entered if ΔP≥0.2, as illustrated in FIG. 10.

The power difference ΔP when a misalignment has occurred and the power difference ΔP when a foreign object has entered, however, might be substantially the same depending on the size of a foreign object and the shapes and materials of the power transmitting coil and the power receiving coil.

In FIG. 10, the power difference ΔP of point a (power receiving coil C/move) and that of point b (power receiving coil C/steel) are close to each other. If measurement accuracy is low, the power difference ΔP of point a and that of point b might be substantially the same, and it might be difficult to determine whether point a and point b are results at a time when a misalignment has occurred or results at a time when a foreign object has entered, By adding the parameter of the voltage difference ΔV as the vertical axis, a Euclidean distance between point a (power receiving coil C/move) and point b (power receiving coil C/steel) increases. As a result, the two points can be distinguished more clearly.

As a method for distinguishing the two points, for example, a method may be adopted in which, if a measured value exists within a range of a curve indicated by an elliptic equation illustrated in FIG. 10, it is determined that the position of the terminal has changed and the power transmission continues, and, if not, it is determined that a foreign object has entered and the power transmission is stopped.

Figure 11:
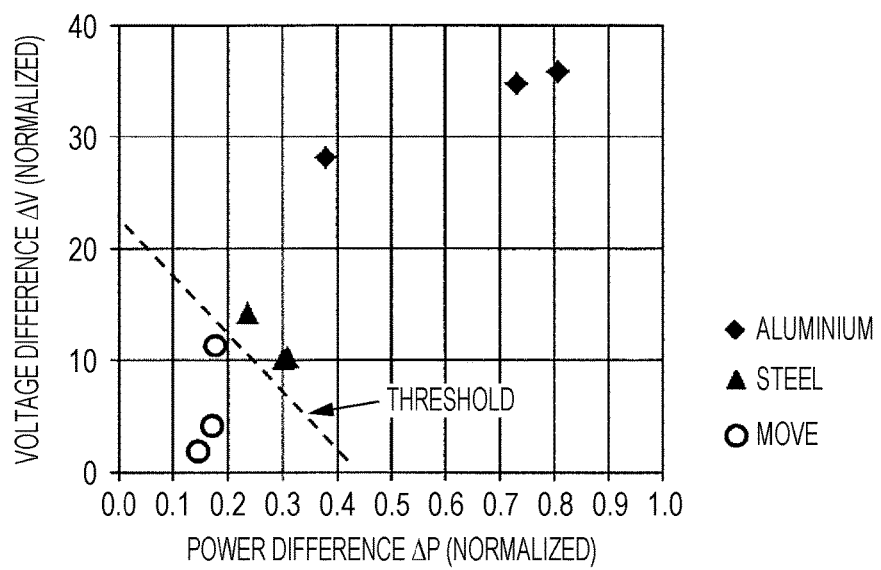
FIG. 11 is a diagram illustrating an example of the present disclosure in which the threshold is determined using a linear equation.

The threshold curve that defines the range may be represented by a function that uniquely determines the difference ΔQ in the control parameter Q (e.g., the voltage difference ΔV) relative to the power difference ΔP. The threshold curve that defines the range is not limited to a curve, and may be a straight line (linear equation), for example, as indicated by a broken line in FIG. 11. If a straight line is used, calculation for the determination becomes simpler, and processing speed increases. Alternatively, the range may be determined using a combination of a curve and a straight line.

A foreign object detecting device, a wireless power transmitting device, and the wireless power transmission system in the present disclosure are not limited to the above embodiments, and have, for example, configurations described in the following items.

Item 1

A power transmitting device that wirelessly transmits transmitting power to a power receiving device including a receiver resonator, the power transmitting device comprising:

a transmitter resonator that is electromagnetically coupled with a receiver resonator and transmits transmitting power;

an inverter circuit that generates the transmitting power to be output to the transmitter resonator; and a power transmission control circuit that adjusts the transmitting power output from the inverter circuit by adjusting a control parameter Q that determines a voltage of the transmitting power based on information indicating a voltage inside the power receiving device, the information being input from the power receiving device, wherein, in a state in which a predetermined period of time has elapsed since a beginning of power transmission and the transmitting power has converged within a predetermined range, the power transmission control circuit determines transmitting power P(t1) at a first time t1, which is a beginning of a first unit time, and transmitting power P(t2) at a second time t2, which is an end of the first unit time, wherein the power transmission control circuit stores a control parameter Q(t3) that determines a voltage of the transmitting power at a third time t3, which is a beginning of a second unit time, and a control parameter Q(t4) that determines a voltage of the transmitting power at a fourth time t4, which is an end of the second unit time, wherein the power transmission control circuit determines a power difference ΔP=P(t2)−P(t1) and a difference ΔQ=Q(t4)−Q(t3) in the control parameter Q, wherein, if the power difference ΔP is equal to or larger than a first threshold and an absolute value of the difference ΔQ in the control parameter Q is equal to or larger than a second threshold, the power transmission control circuit determines that there is a foreign object between the receiver resonator and the transmitter resonator and decreases the transmitting power output from the inverter circuit, and wherein, if the power difference ΔP is smaller than the first threshold or if the absolute value of the difference ΔQ in the control parameter Q is smaller than the second threshold, the power transmission control circuit determines that there is no object between the receiver resonator and the transmitter resonator and causes the inverter circuit to continue transmitting the same transmitting power.

According to this aspect, occurrence of a misalignment between the coils and entry of a foreign object between the coils can be accurately distinguished based on both the power difference ΔP and the difference ΔQ in the control parameter Q, even if the power difference ΔPc when a misalignment has occurred and the power difference ΔPo when a foreign object has entered between the coils are substantially the same (ΔPc≈ΔPo), that is, even if the power difference ΔP is close to the predetermined threshold ΔPth.

Furthermore, since the determination is made based on the power difference ΔP and the difference ΔQ in the control parameter Q in the power transmitting device, for example, data regarding the receiving power transmitted from the power receiving device at long intervals, namely at intervals of several seconds, need not be obtained. By calculating the power difference ΔP and the difference ΔQ in the control parameter Q at intervals (e.g., at intervals of several milliseconds) sufficiently shorter than intervals of several seconds, it can be immediately determined whether a foreign object has entered between the power transmitting coil and the power receiving coil.

Item 2

The power transmitting device according to Item 1, wherein the second time t2 is a time after a predetermined period of time has elapsed since the first time t1 and at which an amount of change in the transmitting power per predetermined period converges within a predetermined range after the transmitting power increases.

According to this aspect, since the second time t2 is a time after a predetermined period of time has elapsed since the first time t1 and at which an amount of change in the transmitting power per predetermined period converges within a predetermined range after the transmitting power increases, entry of a foreign object between the power transmitting coil of the transmitter resonator and the power receiving coil of the receiver resonator can be accurately detected. In addition, occurrence of a misalignment between the power transmitting coil and the power receiving coil and entry of a foreign object between the coils can be accurately distinguished using the power difference ΔP and the difference ΔQ in the control parameter Q.

Item 3

The power transmitting device according to Item 1 or 2, wherein, if the power difference ΔP is equal to or larger than the first threshold and the absolute value of the difference ΔQ in the control parameter Q is equal to or larger than the second threshold, the power transmission control circuit causes the inverter circuit to stop outputting the transmitting power.

According to this aspect, since the inverter circuit stops outputting the transmitting power, overheating of a foreign object can be prevented.

Item 4

The power transmitting device according to any of Items 1 to 3, wherein the control parameter Q includes at least either a parameter that determines an output period ratio, which is a ratio of a period of time for which the voltage output from the inverter circuit is not zero to one period of the voltage, or a frequency of the voltage.

According to this aspect, since at least either the parameter that determines the output period ratio, which is a ratio of a period of time for which the voltage output from the inverter circuit is not zero to one period of the voltage, or a frequency of the voltage is used as the control parameter Q, occurrence of a misalignment between the coils and entry of a foreign object between the coils can be accurately distinguished.

Item 5

The power transmitting device according to any of Items 1 to 4, wherein the inverter circuit includes four switching devices, wherein the four switching devices include a first switching device pair that, when closed, outputs a voltage having the same polarity as a voltage input from an external direct current power supply and a second switching device pair that, when closed, outputs a voltage having an opposite polarity to a polarity of the voltage input from the direct current power supply, wherein the power transmission control circuit outputs a pulse signal for switching each of the four switching devices between a closed state and an open state to each of the fourth switching devices, and wherein the control parameter Q includes a phase difference between the two pulse signals output to the first switching device pair from the power transmission control circuit and a phase difference between the other two pulse signals output to the second switching device pair.

According to this aspect, since the phase difference between the two pulse signals output to a switching device pair is used as the control parameter Q, occurrence of a misalignment between the coils and entry of a foreign object between the coils can be accurately distinguished.

Item 6

The power transmitting device according to any of Items 1 to 5, wherein, if a first evaluation parameter X=ΔP/P(t1) and a second evaluation parameter Y=ΔQ/Q(t3) fall out of corresponding predetermined ranges, the power transmission control circuit decreases the transmitting power output from the inverter circuit.

According to this aspect, since normalization is performed, variation in the amount of change depending on the type of terminal or differences in the degree of misalignment can be suppressed, thereby further reducing the possibility of erroneous detection.

Item 7

The power transmitting device according to any of Items 4 to 6, further comprising:

a display;

wherein, after detecting a foreign object and stopping the power transmission, the power transmission control circuit changes a display state of the display.

According to this aspect, since the user can notice, using the display, that the power transmission has stopped, the user can understand that an abnormality has occurred in the power transmitting device.

Item 8

A power transmitting device that wirelessly transmits transmitting power to a power receiving device including a receiver resonator, the power transmitting device comprising:

a transmitter resonator that is electromagnetically coupled with the receiver resonator and that transmits the transmitting power;

an inverter circuit that generates the transmitting power to be output to the transmitter resonator; and a power transmission control circuit that adjusts the transmitting power output from the inverter circuit by adjusting a control parameter that determines a voltage of the transmitting power based on information indicating a voltage inside the power receiving device, the information being input from the power receiving device, wherein, in a state in which a predetermined period of time has elapsed since a beginning of power transmission and the transmitting power has converged within a predetermined range, the power transmission control circuit determines transmitting power P(t1) at a first time t1, which is a beginning of a first unit time, and transmitting power P(t2) at a second time t2, which is an end of the first unit time, wherein the power transmission control circuit stores a voltage V(t3) of the transmitting power at a third time t3, which is a beginning of a second unit time, and a voltage V(t4) of the transmitting power at a fourth time t4, which is an end of the second unit time, wherein the power transmission control circuit determines a power difference ΔP=P(t2)−P(t1) and a voltage difference ΔV=V(t4)−V(t3), wherein, if the power difference ΔP is equal to or larger than a first threshold and the voltage difference ΔV is equal to or larger than a second threshold, the power transmission control circuit determines that there is a foreign object between the receiver resonator and the transmitter resonator and decreases the transmitting power output from the inverter circuit, and wherein, if the power difference ΔP is smaller than the first threshold or if the voltage difference ΔV is smaller than the second threshold, the power transmission control circuit determines that there is no foreign object between the receiver resonator and the transmitter resonator and causes the inverter circuit to continue transmitting the same transmitting power.

According to this aspect, occurrence of a misalignment between the coils and entry of a foreign object between the coils can be accurately distinguished based on both the power difference ΔP and the voltage difference ΔV, even if the power difference ΔPc when a misalignment has occurred and the power difference ΔPo when a foreign object has entered between the coils are substantially the same (ΔPc≈ΔPo), that is, even if the power difference ΔP is close to the predetermined threshold ΔPth.

Furthermore, since the determination is made based on the power difference ΔP and the voltage difference ΔV in the power transmitting device, for example, data regarding the receiving power transmitted from the power receiving device at long intervals, namely at intervals of several seconds, need not be obtained. By calculating the power difference ΔP and the voltage difference ΔV at intervals (e.g., at intervals of several milliseconds) sufficiently shorter than intervals of several seconds, it can be immediately determined whether a foreign object has entered between the power transmitting coil and the power receiving coil.

Item 9

The power transmitting device according to Item 8, wherein, if the power difference ΔP is equal to or larger than the first threshold and the voltage difference ΔV is equal to or larger than the second threshold, the power transmission control circuit causes the inverter circuit to stop outputting the transmitting power.

According to this aspect, since the inverter circuit stops outputting the transmitting power, overheating of a foreign object can be prevented.

Item 10

The power transmitting device according to Item 8 or 9, wherein, if a first evaluation parameter X=ΔP/P(t1) and a third evaluation parameter Z=ΔV/V(t3) fall out of corresponding predetermined ranges, the power transmission control circuit decreases the transmitting power output from the inverter circuit.

According to this aspect, since normalization is performed, variation in the amount of change depending on the type of terminal or differences in the degree of misalignment can be suppressed, thereby further reducing the possibility of erroneous detection.

Item 11

A power transmitting device that wirelessly transmits transmitting power to a power receiving device including a receiver resonator, the power transmitting device comprising;

a transmitter resonator that is electromagnetically coupled with the receiver resonator and that transmits the transmitting power;

an inverter circuit that generates the transmitting power to be output to the transmitter resonator;

a power transmission control circuit that adjusts the transmitting power output from the inverter circuit by adjusting a control parameter Q that determines a voltage of the transmitting power based on information indicating a voltage inside the power receiving device, the information being input from the power receiving device; and a sensor circuit that measures the control parameter Q, wherein, in a state in which a predetermined period of time has elapsed since a beginning of power transmission and the transmitting power has converged within a predetermined range, the power transmission control circuit determines transmitting power P(t1) at a first time t1, which is a beginning of a first unit time, and transmitting power P(t2) at a second time t2, which is an end of the first unit time, wherein the power transmission control circuit stores a measured value S(t3) obtained by measuring a control parameter Q(t3) that determines a voltage of the transmitting power at a third time t3, which is a beginning of a second unit time, and a measured value S(t4) obtained by measuring a control parameter Q(t4) that determines a voltage of the transmitting power at a fourth time t4, which is an end of the second unit time, wherein the power transmission control circuit determines a power difference ΔP=P(t2)−P(t1) and a difference ΔS=S(t4)−S(t3) in the measured value of the control parameter Q, wherein, if the power difference ΔP is equal to or larger than a first threshold and an absolute value of the difference ΔS in the measured value of the control parameter Q is equal to or larger than a third threshold, the power transmission control circuit determines that there is a foreign object between the receiver resonator and the transmitter resonator and decreases the transmitting power output from the inverter circuit, and wherein, if the power difference ΔP is smaller than the first threshold or if the absolute value of the difference ΔS in the measured value of the control parameter Q is smaller than the third threshold, the power transmission control circuit determines that there is no foreign object between the receiver resonator and the transmitter resonator and causes the inverter circuit to continue transmitting the same transmitting power.

The inverter circuit might be affected by noise or ambient temperature and operate at a value different from a target control parameter. According to this aspect, since the sensor circuit that measures the control parameter Q is included, an actual change in the control parameter Q after a foreign object enters between the coils can be stored in a memory, and a foreign object can therefore be detected more accurately.

Item 12

The power transmitting device according to Item 11, wherein the control parameter Q includes at least either a parameter that determines an output period ratio, which is a ratio of a period of time for which the voltage output from the inverter circuit is not zero to one period of the voltage, or a frequency of the voltage.

According to this aspect, occurrence of a misalignment between the coils and entry of a foreign object between the coils can be distinguished more accurately using at least either the parameter that determines the output period ratio, which is a ratio of a period of time for which the voltage output from the inverter circuit is not zero to one period of the voltage, or the frequency of the voltage as the control parameter Q.

Item 13

The power transmitting device according to Item 11 or 12, wherein the inverter circuit includes four switching devices, wherein the four switching devices include a first switching device pair that, when closed, outputs a voltage having the same polarity as a voltage input from an external direct current power supply and a second switching device pair that, when closed, outputs a voltage having an opposite polarity to a polarity of the voltage input from the direct current power supply, wherein the power transmission control circuit outputs a pulse signal for switching each of the four switching devices between a closed state and an open state to each of the fourth switching devices, and wherein the control parameter Q includes a phase difference between the two pulse signals output to the first switching device pair from the power transmission control circuit and a phase difference between the other two pulse signals output to the second switching device pair.

According to this aspect, since the phase difference between the two pulse signals output to a switching device pair is used as the control parameter Q, occurrence of a misalignment between the coils and entry of a foreign object between the coils can be distinguished more accurately.

Item 14

The power transmitting device according to any of Items 11 to 13, wherein, if a first evaluation parameter $X=\Delta P/P(t1)$ and a fourth evaluation parameter $Y=\Delta S/S(t3)$ fall out of corresponding predetermined ranges, the power transmission control circuit decreases the transmitting power output from the inverter circuit.

According to this aspect, since normalization is performed, variation in the amount of change depending on the type of terminal or differences in the degree of misalignment can be suppressed, thereby further reducing the possibility of erroneous detection.

Item 15

A wireless power transmission system comprising:
the power transmitting device according to any of Items 1 to 14; and
a power receiving device.

The power transmitting device and the wireless power transmission system including the power transmitting device in the present disclosure can be widely used for charging, or supplying power to, electric automobiles, audiovisual (AV) devices, batteries, medical devices, and the like. According to the embodiments of the present disclosure, a risk of overheating of a foreign object between a power transmitting coil and a power receiving coil can be avoided, and a decrease in efficiency due to the process for detecting a foreign object can be suppressed.

What is claimed is:

1. A power transmitting device comprising:
a transmitter resonator that is electromagnetically coupled with a receiver resonator of a power receiving device and that transmits transmitting power;
an inverter circuit that generates the transmitting power to be output to the transmitter resonator; and
a power transmission control circuit that adjusts the transmitting power output from the inverter circuit by adjusting a control parameter Q that determines a voltage of the transmitting power based on information indicating a voltage inside the power receiving device, the information being input from the power receiving device,
wherein, in a state in which a predetermined period has elapsed since a beginning of power transmission and the transmitting power has converged within a predetermined range, the power transmission control circuit determines transmitting power $P(t1)$ at a first time t1, which is a beginning of a first unit time, and transmitting power $P(t2)$ at a second time t2, which is an end of the first unit time,
wherein the power transmission control circuit stores a control parameter $Q(t3)$ that determines a voltage of the transmitting power at a third time t3, which is a beginning of a second unit time, and a control parameter $Q(t4)$ that determines a voltage of the transmitting power at a fourth time t4, which is an end of the second unit time,
wherein the power transmission control circuit determines a power difference $\Delta P = P(t2)-P(t1)$ and a difference $\Delta Q = Q(t4)-Q(t3)$ in the control parameter Q,
wherein, if the $\Delta P$ is equal to or larger than a first threshold and an absolute value of the $\Delta Q$ is equal to or larger than a second threshold, the power transmission control circuit determines that there is a foreign object between the receiver resonator and the transmitter resonator and decreases the transmitting power output from the inverter circuit,
wherein, if the $\Delta P$ is smaller than the first threshold or if the absolute value of the $\Delta Q$ is smaller than the second threshold, the power transmission control circuit determines that there is no foreign object between the receiver resonator and the transmitter resonator and causes the inverter circuit to continue transmitting the same transmitting power, and
wherein the control parameter Q includes at least either a parameter that determines an output period ratio, which is a ratio of a period of time for which the voltage output from the inverter circuit is not zero to one period of the voltage, or a frequency of the voltage.

2. The power transmitting device according to claim 1, wherein the t2 is a time after a predetermined period of time has elapsed since the t1 and at which an amount of change in the transmitting power per predetermined period converges within a predetermined range after the transmitting power increases.

3. The power transmitting device according to claim 1, wherein, if the ΔP is equal to or larger than the first threshold and the absolute value of the is equal to or larger than the second threshold, the power transmission control circuit causes the inverter circuit to stop outputting the transmitting power.

4. The power transmitting device according to claim 1,
wherein the inverter circuit includes four switching devices,
wherein the four switching devices include a first switching device pair that, when closed, outputs a voltage having the same polarity as a voltage input from an external direct current power supply and a second switching device pair that, when closed, outputs a voltage having an opposite polarity to a polarity of the voltage input from the direct current power supply,
wherein the power transmission control circuit outputs a pulse signal for switching each of the four switching devices between a closed state and an open state to each of the fourth switching devices, and
wherein the control parameter Q includes a phase difference between the two pulse signals output to the first switching device pair from the power transmission control circuit and a phase difference between the other two pulse signals output to the second switching device pair.

5. The power transmitting device according to claim 1,
wherein, if a first evaluation parameter $X=\Delta P/P(t1)$ and a second evaluation parameter $Y=\Delta Q/Q(t3)$ fall out of corresponding predetermined ranges, the power transmission control circuit decreases the transmitting power output from the inverter circuit.

6. The power transmitting device according to Claim 1, further comprising: a display; wherein, after detecting the foreign object and stopping the power transmission, the power transmission control circuit changes a display state of the display.

7. A wireless power transmission system comprising:
the power transmitting device according to claim 1; and
a power receiving device.

8. A power transmitting device comprising:
a transmitter resonator that is electromagnetically coupled with the receiver resonator of a power receiving device and that transmits the transmitting power;
an inverter circuit that generates the transmitting power to be output to the transmitter resonator; and
a power transmission control circuit that adjusts the transmitting power output from the inverter circuit by adjusting a control parameter that determines a voltage of the transmitting power based on information indicating a voltage inside the power receiving device, the information being input from the power receiving device,
wherein, in a state in which a predetermined period of time has elapsed since a beginning of power transmission and the transmitting power has converged within a predetermined range, the power transmission control circuit determines transmitting power $P(t1)$ at a first time t1, which is a beginning of a first unit time, and transmitting power $P(t2)$ at a second time t2, which is an end of the first unit time,
wherein the power transmission control circuit stores a voltage $V(t3)$ of the transmitting power at a third time t3, which is a beginning of a second unit time, and a voltage $V(t4)$ of the transmitting power at a fourth time t4, which is an end of the second unit time,
wherein the power transmission control circuit determines a power difference $\Delta P = P(t2)-P(t1)$ and a voltage difference $\Delta V = V(t4)-V(t3)$,
wherein, if the ΔP is equal to or larger than a first threshold and the ΔV is equal to or larger than a second threshold, the power transmission control circuit determines that there is a foreign object between the receiver resonator and the transmitter resonator and decreases the transmitting power output from the inverter circuit, and
wherein, if the ΔP is smaller than the first threshold or if the ΔV is smaller than the second threshold, the power transmission control circuit determines that there is no foreign object between the receiver resonator and the transmitter resonator and causes the inverter circuit to continue transmitting the same transmitting power.

9. The power transmitting device according to claim 8,
wherein, if the ΔP is equal to or larger than the first threshold and the ΔV is equal to or larger than the second threshold, the power transmission control circuit causes the inverter circuit to stop outputting the transmitting power.

10. The power transmitting device according to claim 8, wherein, if a first evaluation parameter $X=\Delta P/P(t1)$ and a third evaluation parameter $Z=\Delta V/V(t3)$ fall out of corresponding predetermined ranges, the power transmission control circuit decreases the transmitting power output from the inverter circuit.

11. A power transmitting device comprising:
a transmitter resonator that is electromagnetically coupled with the receiver resonator of a power receiving device and that transmits the transmitting power;
an inverter circuit that generates the transmitting power to be output to the transmitter resonator;
a power transmission control circuit that adjusts the transmitting power output from the inverter circuit by adjusting a control parameter Q that determines a voltage of the transmitting power based on information indicating a voltage inside the power receiving device, the information being input from the power receiving device; and
a sensor circuit that measures the control parameter Q,
wherein, in a state in which a predetermined period of time has elapsed since a beginning of power transmission and the transmitting power has converged within a predetermined range, the power transmission control circuit determines transmitting power $P(t1)$ at a first time t1, which is a beginning of a first unit time, and transmitting power $P(t2)$ at a second time t2, which is an end of the first unit time,
wherein the power transmission control circuit stores a measured value $S(t3)$ obtained by measuring a control parameter $Q(t3)$ that determines a voltage of the transmitting power at a third time t3, which is a beginning of a second unit time, and a measured value $S(t4)$ obtained by measuring a control parameter $Q(t4)$ that determines a voltage of the transmitting power at a fourth time t4, which is an end of the second unit time,
wherein the power transmission control circuit determines a power difference $\Delta P = P(t2)-P(t1)$ and a difference $\Delta S = S(t4)-S(t3)$ in the measured value of the control parameter Q,
wherein, if the ΔP is equal to or larger than a first threshold and an absolute value of the ΔS is equal to or larger than a third threshold, the power transmission control circuit determines that there is a foreign object between the receiver resonator and the transmitter resonator and decreases the transmitting power output from the inverter circuit, and wherein, if the ΔP is smaller than the first threshold or if the absolute value of the ΔS is smaller than the third threshold, the power transmission control circuit determines that there is no foreign object between the receiver resonator and the transmitter resonator and causes the inverter circuit to continue transmitting the same transmitting power.

12. The power transmitting device according to claim 11, wherein the control parameter Q includes at least either a parameter that determines an output period ratio, which is a ratio of a period of time for which the voltage output from the inverter circuit is not zero to one period of the voltage, or a frequency of the voltage.

13. The power transmitting device according to claim 11, wherein the inverter circuit includes four switching devices, wherein the four switching devices include a first switching device pair that, when closed, outputs a voltage having the same polarity as a voltage input from an external direct current power supply and a second switching device pair that, when closed, outputs a voltage having an opposite polarity to a polarity of the voltage input from the direct current power supply, wherein the power transmission control circuit outputs a pulse signal for switching each of the four switching devices between a closed state and an open state to each of the fourth switching devices, and wherein the control parameter Q includes a phase difference between the two pulse signals output to the first switching device pair from the power transmission control circuit and a phase difference between the other two pulse signals output to the second switching device pair.

14. The power transmitting device according to claim 11, wherein, if a first evaluation parameter X=ΔP/P(t1) and a fourth evaluation parameter Y=ΔS/S(t3) fall out of corresponding predetermined ranges, the power transmission control circuit decreases the transmitting power output from the inverter circuit.

\* \* \* \* \*